United States Patent
Murata

(10) Patent No.: US 10,338,215 B2
(45) Date of Patent: Jul. 2, 2019

(54) MEASURING POINT INFORMATION PROVIDING DEVICE, CHANGE DETECTION DEVICE, METHODS THEREOF, AND RECORDING MEDIUM

(71) Applicant: NEC Corporation, Minato-ku, Tokyo (JP)

(72) Inventor: Minoru Murata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 14/704,097

(22) Filed: May 5, 2015

(65) Prior Publication Data
US 2015/0323665 A1 Nov. 12, 2015

(30) Foreign Application Priority Data
May 9, 2014 (JP) .................................. 2014-097644

(51) Int. Cl.
*G01S 13/90* (2006.01)
*G01S 7/02* (2006.01)
(Continued)

(52) U.S. Cl.
CPC .............. *G01S 13/90* (2013.01); *G01S 7/025* (2013.01); *G01S 7/411* (2013.01); *G01S 13/9023* (2013.01); *G01S 2013/9076* (2013.01)

(58) Field of Classification Search
CPC . G01S 7/02; G01S 7/024; G01S 7/025; G01S 7/41; G01S 7/411; G01S 13/88;
(Continued)

(56) References Cited

U.S. PATENT DOCUMENTS 5,053,778 A * 10/1991 Imhoff ..................... G01S 13/90
342/191
5,313,210 A * 5/1994 Gail ........................ G01S 7/025
342/174
(Continued)

FOREIGN PATENT DOCUMENTS

JP 9-178847 A * 7/1997 ............. G01S 13/90
JP 2003-215240 A 7/2003
(Continued)

OTHER PUBLICATIONS

Alessandro Ferretti, Claudio Prati, and Fabio Rocca, "Nonlinear Subsidence Rate Estimation Using Permanent Scatterers in Differential SAR Interferometry", IEEE Transaction on Geoscience and Remote Sensing, vol. 38, No. 5, Sep. 2000.
(Continued)

*Primary Examiner* — Bernarr E Gregory

(57) ABSTRACT

The measuring point information providing device of the present invention inputs an SAR image set holding at least information indicative of a reflection intensity and a phase so as to be associated with each pixel corresponding to a resolution cell within a field of vision for image capturing including a specific region. The information is generated from observation data formed of four basic polarization pairs, i.e. HH, HV, VH and VV polarization pairs observed at generally the same time. The measuring point information providing device determines a polarization pair whose reflection intensity is not less than a predetermined value or the highest with respect to each target pixel by using the input SAR image set, and generates measuring point information including at least information indicative of the determined polarization pair of the target pixel based on a polarization pair determined by the polarization pair determination unit.

10 Claims, 18 Drawing Sheets

(51) Int. Cl.
*G01S 7/41* (2006.01)
*G01S 13/00* (2006.01)

(58) Field of Classification Search
CPC ...... G01S 13/89; G01S 13/90; G01S 13/9023;
G01S 13/9035; G01S 2013/9076; G01S 13/9029
See application file for complete search history.

(56) References Cited

U.S. PATENT DOCUMENTS

| | | | | |
|---|---|---|---|---|
| 5,552,787 | A * | 9/1996 | Schuler | G01S 7/024 342/188 |
| 6,359,584 | B1 * | 3/2002 | Cordey | G01S 7/025 342/165 |
| 6,781,540 | B1 * | 8/2004 | MacKey | G01S 13/90 342/188 |
| 6,952,178 | B2 * | 10/2005 | Kirscht | G01S 13/9029 342/107 |
| 7,492,303 | B1 * | 2/2009 | Levitan | G01S 7/024 342/188 |
| 7,746,267 | B2 * | 6/2010 | Raney | G01S 13/90 342/188 |
| 7,825,847 | B2 * | 11/2010 | Fujimura | G01S 7/025 342/188 |
| 8,125,370 | B1 * | 2/2012 | Rogers | G01S 7/025 342/25 F |
| 9,395,437 | B2 * | 7/2016 | Ton | G01S 13/90 |
| 2009/0102704 | A1 * | 4/2009 | Fujimura | G01S 7/025 342/25 A |
| 2009/0102705 | A1 * | 4/2009 | Obermeyer | G01S 13/90 342/25 F |
| 2009/0262011 | A1 * | 10/2009 | Calderbank | G01S 7/024 342/188 |
| 2010/0045513 | A1 | 2/2010 | Pett | |
| 2014/0062764 | A1 * | 3/2014 | Reis | G01S 13/9035 342/25 C |

FOREIGN PATENT DOCUMENTS

| | | | | |
|---|---|---|---|---|
| JP | 2007-078398 A | 3/2007 | | |
| JP | 2008-232626 A | 10/2008 | | |
| JP | 5305985 B2 | 9/2010 | | |
| WO | WO2010/000870 A1 * | 1/2010 | ............ | G01S 13/90 |

OTHER PUBLICATIONS

Alessandro Ferretti, Claudio Prati, and Fabio Rocca, "Permanent Scatterers in SAR Interferometry", IEEE Transaction on Geoscience and Remote Sensing, vol. 39, No. 1, Jan. 2001.
Tetsuya Jitsufuchi, "Feasibility of the Multi Frequency, Full Polarimetric SAR Image Data as a Disaster Observation Technique Verified by Ground Truth Data and Optical Sensor Image Data", Study Report of National Research Institute for Earth Science and Disaster Prevention, vol. 63, Jun. 2002.
Refice A et al: "Polarirnetric optimisation applied to permanent scatterers identification", Learning From Earth's Shapes and Sizes :IGARSS 2003 ; 2003 IEEE International Geoscience and Remote Symposium ; Centre De Congres Pierre Baudis, Toulouse, France, Jul. 21-25, 2003 ; Proceedings; [IEEE International Geoscience and Remote Sensing SYM, vol. 2, Jul. 21, 2003 (Jul. 21, 2003), pp. 687-689 Cited in EESR.
Romeiser R et al: "Study on Concepts for Radar Interferometry from Satellites for Ocean (and Land) Applications" , Internet Citation, Apr. 2002 (Apr. 2002), XP002363347, Retrieved from the Internet: URL:http://www.ifm.uni-hamburg.de/wwwrs/ko riolis_ sect3.pdf [retrieved on Jan. 18, 2006] *paragraphs [3.1.1], [3.2.3.2], [03.5] Cited in EESR.
Brown L M J et al: "Polarimetric Synthetic-Aperture Radar: Fundamental Concepts and Analysis Tools", GEC Journal of Research, GEC Marconi Research Center. Great Baddow Chemsford, GB, vol. 9, No. 1, Jan. 1, 1991 (Jan. 1, 1991),pp. 23-35,XP000262885, ISSN: 0264-9187 *abstract* *paragraphs [0001], [02.1]—[02.7], [04. 2] , [0005] * Cited in EESR.
EESR for EP Application No. 15165444.9 dated Oct. 9, 2015 with English Translation.
Japanese Office Action for JP Application No. 2014-097644 dated Feb. 20, 2018 with English Translation.
Japanese Office Action for JP Application No. 2014-097644 dated May 8, 2018 with English Translation.

* cited by examiner

MEASURING POINT INFORMATION PROVIDING DEVICE, CHANGE DETECTION DEVICE, METHODS THEREOF, AND RECORDING MEDIUM

This application is based upon and claims the benefit of priority from Japanese patent application No. 2014-097644, filed on May 9, 2014, the disclosure of which is incorporated herein in its entirety by reference.

TECHNICAL FIELD

The present invention relates to a measuring point information providing device which provides a user with information about a measuring point at which displacement can be measured, a change detection device for detecting a change of the ground surface or an object, a measuring point information providing method, a change detection method, and a program for providing measuring point information and a program for detecting a change.

BACKGROUND ART

One of the techniques for calculating a change of the ground surface or an object is a technique called PS-InSAR (Permanent/Persistent Scatters Interferometric Synthetic Aperture Radar) (e.g. Non-Patent Document 1 and Non-Patent Document 2). PS-InSAR is a technique for measuring displacement at a point on the ground surface or a certain object by applying interferometry to SAR data which is data obtained with respect to a point having PS (Permanent/Persistent Scatters) properties by a synthetic aperture radar (SAR). Radio waves have a characteristic of allowing their observation irrespective of weather or even at night because they pass through clouds or rain unlike light waves. In the following, a point on the ground surface or on an object whose displacement is to be measured in PS-InSAR will be referred to as a measuring point. Each point on the ground surface or on an object corresponds to each resolution cell in a field of vision for image capturing of the synthetic aperture radar.

Here, PS properties are properties in which a radio wave scattering characteristic is not changed with a lapse of time. While plants or waves are among those not having PS properties, most of artificial structures have PS properties at numbers of places thereof. In PS-InSAR, however, use of a certain place as a measuring point requires a certain degree of backscattering intensity (hereinafter referred to as reflection intensity) in addition to PS properties. This is because when a reflection intensity is low, signals may be buried in noise. Such a limitation on measuring points decreases the advantage of PS-InSAR.

It is known that for example, at a point having such a shape as a single flat board, backscattering is so weak that even if it has PS properties, the point is less likely to be considered as a measuring point. It is also known that for example, at a point having such a shape made of three square or rectangular equilateral triangle plates joined together so as to be opposed to each other at right angles as used in a corner reflector (CR) (e.g. four corners of a window frame), backscattering is easily returned, so that such a point is appropriate as a measuring point.

As a technique related to the present invention, for example, Patent Document 1 recites a technique of storing, in a storage device in advance, a result as polarization property data for each measuring position, which result is obtained by measuring at least three kinds of polarization components among scattered waves obtained from a plurality of reflected radio waves having different polarization properties and determining whether an object at each measuring position is an artifact or not using the stored polarization property data.

For example, Non-Patent Document 3 recites that pseudo color composite display of full polarimetric SAR image data is executed, with a set of three polarizations (e.g. HH polarization, HV polarization and VV polarization) associated with red, green and blue, each set having four kinds of data whose values are different from each other. The four kinds of data are assumed to be backscattering coefficients of full polarimetric SAR image data, including an ellipse orientation angle $\psi_r$ of a reception polarization, an ellipticity angle $\chi_r$ of a reception polarization, an ellipse orientation angle $\psi_t$ of a transmission polarization and an ellipticity angle $\chi_r$ of a transmission polarization. Non-Patent Document 3 also discloses, as one of application examples of full polarimetric SAR image data, an example where a transmission and reception condition that attains the highest contrast between two target objects is obtained and based on the condition, a specific target object to be identified and another target object are displayed such that a ratio of a pixel value of the specific target to that of another target is the highest.

CITATION LIST

Patent Literature

[PTL 1]
Japanese Patent No. 5305985

Non-Patent Literature

[NPL 1]
Alessandro Ferretti, Claudio Prati, and Fabio Rocca, "Nonlinear Subsidence Rate Estimation Using Permanent Scatterers in Differential SAR Interferometry", IEEE TRANSACTION ON GEOSCIENCE AND REMOTE SENSING, VOL. 38, No. 5, September 2000.
[NPL 2]
Alessandro Ferretti, Claudio Prati, and Fabio Rocca, "Permanent Scatterers in SAR Interferometry", IEEE TRANSACTION ON GEOSCIENCE AND REMOTE SENSING, VOL. 39, No. 1, January 2001.
[NPL 3]
Tetsuya JITSUFUCHI, "Feasibility of the Multi Frequency, Full Polarimetric SAR Image Data as a Disaster Observation Technique Verified by Ground Truth Data and Optical Sensor Image Data", Study Report of National Research Institute for Earth Science and Disaster Prevention, VOL. 63, June 2002.

SUMMARY

Technical Problem

In actual PS-InSAR processing, displacement at a point (hereinafter referred to as a spot) on the ground surface or on an object is measured using only an SAR image in a predetermined polarization direction. Specifically, one combination of transmission and reception polarizations is selected from representative transmission and reception polarizations, i.e. an HH polarization, an HV polarization, a VH polarization and a VV polarization, and as many SAR images formed of the selected combination of transmission and reception polarizations are acquired as the number of a plurality of times before and after a period when a change is to be detected, thereby executing arithmetic processing for detecting a change.

An H (Horizontal) polarization represents a horizontal polarization, i.e. a polarization having a polarization direction, which is an electric field oscillating direction, in parallel to a horizontal plane. A V (Vertical) polarization represents a vertical polarization, i.e. a polarization having a polarization direction vertical to the horizontal plane. The first alphabet of a transmission and reception polarization combination represents a polarization direction for transmission and the second alphabet represents a polarization direction for reception. Accordingly, an HH polarization represents transmitting horizontal polarization radio waves and receiving horizontal polarization radio waves. An HV polarization represents transmitting horizontal polarization radio waves and receiving vertical polarization radio waves. A VH polarization represents transmitting vertical polarization radio waves and receiving horizontal polarization radio waves. A VV polarization represents transmitting vertical polarization radio waves and receiving vertical polarization radio waves.

In general, when electromagnetic waves in a certain polarization direction are radiated onto a certain spot and reflected and returned from a structure at the spot, the polarization direction might be rotated depending on a shape, a material or the like of the structure at the spot. A rotation angle of the polarization then differs with a shape, a material or the like of the structure, so that it is difficult to predict the rotation angle in advance.

In a case of measuring long-term deterioration caused by distortion, peeling and the like of a wide range of artificial structures such as roads, railways and bridges by detecting a subtle change at a PS point, there occurs a problem that satisfactorily high measurement accuracy cannot be obtained using only an SAR image obtained by one combination of transmission and reception polarizations because the number of measurable points is too small. This is because although a suitable combination of transmission and reception polarizations varies with each place, when only an SAR image obtained by one transmission and reception polarization combination is used, even if there is a point having a high reflection intensity from which an SAR image formed of another combination of transmission and reception polarizations is obtained, the point cannot be used as a measuring point.

The technique recited in Patent Document 1, in which polarization property data as a result obtained by measuring at least three kinds of polarization components at each measuring position is used in order to discriminate artifacts from natural objects by an analysis of scattering components, fails to consider how to detect displacement at as many spots allowing displacement measurement as possible using polarization property data or detect such spots without missing them.

The technique recited in Non-Patent Document 3 is directed to determine how a backscattering intensity differs due to three kinds of polarization components by a hue, or to emphasizedly display a difference between substances having different scattering mechanisms on images. No consideration is given thereto how to detect as many spots allowing displacement measurement as possible or detect such spots without missing them by using a backscattering coefficient.

When a user can be provided with information of as many spots allowing measurement as possible or information of such spots without missing them, the user can designate measuring points based on the information, resulting in an increase in the number of measuring points at which displacement can be measured. In addition, an increase in the number of measuring points at which displacement can be measured enables an increase in change detection sensitivity, which is expected to contribute to improvement in detection accuracy. Further, collating information about a spot at which measurement is possible with a change detection result enables determination whether no displacement occurred or no measurement is possible at a certain spot, or the like, so that it is expected to obtain a more accurate detection result with high sensitivity.

An exemplary object of the present invention is therefore to provide a measuring point information providing device, a change detection device, a measuring point information providing method, a change detection method, and a program for providing measuring point information and a program for detecting a change which enable an increase in change detection sensitivity. It is to be noted that the object is one of a plurality of objects only that exemplary embodiments disclosed in the present specification intend to attain. Other objects or problems and novel characteristics will become apparent from the following description or accompanying drawings of the present specification.

Solution to Problem

The measuring point information providing device according to one aspect of the present invention includes: an SAR image set input unit which inputs an SAR image set holding, so as to be associated with each pixel corresponding to a resolution cell within a field of vision for image capturing including a specific region, at least information indicative of a reflection intensity and a phase, the information being generated from observation data formed of four basic polarization pairs, an HH polarization, an HV polarization, a VH polarization and a VV polarization which are combinations of transmission and reception polarizations observed by a synthetic aperture radar at generally the same time; a polarization pair determination unit which determines a polarization pair whose reflection intensity is not less than a predetermined value or the highest with respect to each target pixel by using the input SAR image set; and a measuring point information generation unit which generates, based on a polarization pair determined by the polarization pair determination unit, measuring point information including at least information indicative of the determined polarization pair of the target pixel.

The change detection device according to another aspect of the present invention includes: an SAR image set input unit which inputs at least two SAR image sets holding, so as to be associated with each pixel corresponding to a resolution cell within a field of vision for image capturing including a specific region, at least information indicative of a reflection intensity and a phase, the information being generated from observation data formed of four basic polarization pairs, an HH polarization, an HV polarization, a VH polarization and a VV polarization which are combinations of transmission and reception polarizations observed by a synthetic aperture radar at generally the same time; a polarization pair determination unit which determines a polarization pair whose reflection intensity is not less than a predetermined value or the highest with respect to each target pixel by using at least one of the input SAR image sets; a measuring point information generation unit which generates, based on a polarization pair determined by the polarization pair determination unit, measuring point information including at least information indicative of the determined polarization pair of the target pixel; a displacement measurement unit which measures displacement at a spot corresponding to the target pixel based on the measuring point information and the input SAR image set; a first output unit which outputs information indicative of a measurement result obtained by the displacement measurement unit; and a second output unit which outputs the measuring point information, or information indicating whether a spot corresponding to the target pixel is appropriate as a measuring point or not or indicating to which degree the spot is appropriate as a measuring point, the information being generated based on the measuring point information.

The change detection device according to another aspect of the present invention includes: an SAR image set input unit which inputs at least two SAR image sets holding, so as to be associated with each pixel corresponding to a resolution cell within a field of vision for image capturing including a specific region, at least information indicative of a reflection intensity and a phase, the information being generated from observation data formed of four basic polarization pairs, an HH polarization, an HV polarization, a VH polarization and a VV polarization which are combinations of transmission and reception polarizations observed by a synthetic aperture radar at generally the same time; a measuring point candidate input unit which inputs a candidate for a measuring point; a polarization pair determination unit which determines a polarization pair whose reflection intensity is not less than a predetermined value or the highest with respect to each target pixel as a pixel corresponding to the input measuring point candidate by using at least one of the input SAR image sets; a measuring point information generation unit which generates, based on a polarization pair determined by the polarization pair determination unit, measuring point information including at least information indicative of the determined polarization pair of the target pixel and information indicative of a reflection intensity obtained by the polarization pair of the target pixel in question; a measuring point condition determination unit which determines whether the input measuring point candidate is appropriate as a measuring point or not based on the measuring point information by using at least a reflection intensity obtained by the determined polarization pair of the pixel corresponding to the candidate in question; a determination result output unit which outputs a determination result made by the measuring point condition determination unit; and a displacement measurement unit which uses, as a measuring point, a candidate determined to be appropriate as a measuring point by the measuring point condition determination unit to measure displacement at the measuring point based on the measuring point information and input SAR image sets.

The measuring point information providing method according to another aspect of the present invention includes: inputting an SAR image set holding, so as to be associated with each pixel corresponding to a resolution cell within a field of vision for image capturing including a specific region, at least information indicative of a reflection intensity and a phase, the information being generated from observation data formed of four basic polarization pairs, an HH polarization, an HV polarization, a VH polarization and a VV polarization which are combinations of transmission and reception polarizations observed by a synthetic aperture radar at generally the same time; determining a polarization pair whose reflection intensity is not less than a predetermined value or the highest with respect to each target pixel by using at least one of the input SAR image sets; and generating, based on a polarization pair determined by the polarization pair determination unit, measuring point information including at least information indicative of the determined polarization pair of the target pixel.

The change detection method according to another aspect of the present invention includes: inputting at least two SAR image sets holding, so as to be associated with each pixel corresponding to a resolution cell within a field of vision for image capturing including a specific region, at least information indicative of a reflection intensity and a phase, the information being generated from observation data formed of four basic polarization pairs, an HH polarization, an HV polarization, a VH polarization and a VV polarization which are combinations of transmission and reception polarizations observed by a synthetic aperture radar at generally the same time; determining a polarization pair whose reflection intensity is not less than a predetermined value or the highest with respect to each target pixel by using input SAR image sets; based on a polarization pair determined by the polarization pair determination unit, generating measuring point information including at least information indicative of the determined polarization pair of the target pixel; measuring displacement at a spot corresponding to the target pixel based on the measuring point information and input SAR image sets; and together with information indicative of a measurement result of displacement at a spot corresponding to the target pixel, outputting the measuring point information, or information indicating whether a spot corresponding to the target pixel is appropriate as a measuring point or not or indicating to which degree the spot is appropriate as a measuring point, the information being generated based on the measuring point information.

The change detection method according to another aspect of the present invention includes: inputting at least two SAR image sets holding, so as to be associated with each pixel corresponding to a resolution cell within a field of vision for image capturing including a specific region, at least information indicative of a reflection intensity and a phase, the information being generated from observation data formed of four basic polarization pairs, an HH polarization, an HV polarization, a VH polarization and a VV polarization which are combinations of transmission and reception polarizations observed by a synthetic aperture radar at generally the same time; inputting a candidate for a measuring point; determining a polarization pair whose reflection intensity is not less than a predetermined value or the highest with respect to each target pixel as a pixel corresponding to the input measuring point candidate by using input SAR image sets; generating, based on the determined polarization pair, measuring point information including at least information indicative of the determined polarization pair of the target pixel and information indicative of a reflection intensity obtained by the polarization pair of the target pixel in question; determining whether the input measuring point candidate is appropriate as a measuring point or not based on the measuring point information by using at least a reflection intensity obtained by the polarization pair of a pixel corresponding to the candidate in question; when determining to be inappropriate as a measuring point by the determination, outputting information to that effect; and when determining to be appropriate as a measuring point by the determination, measuring displacement at the measuring point by using the candidate in question for a measuring point based on the measuring point information and input SAR image sets.

The non-transitory computer readable medium according to another aspect of the present invention records the program causing a computer to execute: the SAR image set input processing of inputting an SAR image set holding, so as to be associated with each pixel corresponding to a resolution cell within a field of vision for image capturing including a specific region, at least information indicative of a reflection intensity and a phase, the information being generated from observation data formed of four basic polarization pairs, an HH polarization, an HV polarization, a VH polarization and a VV polarization which are combinations of transmission and reception polarizations observed by a synthetic aperture radar at generally the same time; the polarization pair determination processing of determining a polarization pair whose reflection intensity is not less than a predetermined value or the highest with respect to each target pixel by using the input SAR image set; and the measuring point information generation processing of generating, based on a polarization pair determined by the polarization pair determination processing, measuring point information including at least information indicative of the determined polarization pair of a target pixel.

The non-transitory computer readable medium according to another aspect of the present invention records the program causing a computer to execute: the SAR image set input processing of inputting at least two SAR image sets holding, so as to be associated with each pixel corresponding to a resolution cell within a field of vision for image capturing including a specific region, at least information indicative of a reflection intensity and a phase, the information being generated from observation data formed of four basic polarization pairs, an HH polarization, an HV polarization, a VH polarization and a VV polarization which are combinations of transmission and reception polarizations observed by a synthetic aperture radar at generally the same time; the polarization pair determination processing of determining a polarization pair whose reflection intensity is not less than a predetermined value or the highest with respect to each target pixel by using input SAR image sets; the measuring point information generation processing of generating, based on a polarization pair determined by the polarization pair determination processing, measuring point information including at least information indicative of the determined polarization pair of the target pixel; the displacement measurement processing of measuring displacement at a spot corresponding to the target pixel based on the measuring point information and input SAR image sets; the first output processing of outputting information indicative of a measurement result of displacement at a spot corresponding to the target pixel; and the second output processing of outputting the measuring point information, or information indicating whether a spot corresponding to the target pixel is appropriate as a measuring point or not or indicating to which degree the spot is appropriate as a measuring point, the information being generated based on the measuring point information.

The non-transitory computer readable medium according to another aspect of the present invention records the program causing a computer to execute: the SAR image set input processing of inputting at least two SAR image sets holding, so as to be associated with each pixel corresponding to a resolution cell within a field of vision for image capturing including a specific region, at least information indicative of a reflection intensity and a phase, the information being generated from observation data formed of four basic polarization pairs, an HH polarization, an HV polarization, a VH polarization and a VV polarization which are combinations of transmission and reception polarizations observed by a synthetic aperture radar at generally the same time; the measuring point candidate input processing of inputting a candidate for a measuring point; the polarization pair determination processing of determining a polarization pair whose reflection intensity is not less than a predetermined value or the highest with respect to each target pixel as a pixel corresponding to the input measuring point candidate by using input SAR image sets; the measuring point information generation processing of generating, based on a polarization pair determined by the polarization pair determination processing, measuring point information including at least information indicative of a determined polarization pair of the target pixel and information indicative of a reflection intensity obtained by the polarization pair of the target pixel in question; the measuring point condition determination processing of determining whether the input measuring point candidate is appropriate as a measuring point or not based on the measuring point information by using at least a reflection intensity obtained by the determined polarization pair of a pixel corresponding to the candidate in question; the determination result output processing of outputting a determination result made by the measuring point condition determination processing; and the displacement measurement processing of using, as a measuring point, a candidate determined to be appropriate as a measuring point by the measuring point condition determination processing to measure displacement at the measuring point based on the measuring point information and input SAR image sets.

Advantageous Effect of Invention

According to aspects of the present invention, since as many spots are detected at which displacement can be measured as possible or such spots are detected without missing them to provide user with information thereof, use of the information for designation of a measuring point or an analysis of a measurement result enables improvement in change detection sensitivity.

DESCRIPTION OF EMBODIMENTS

Exemplary Embodiment 1

Figure 1:
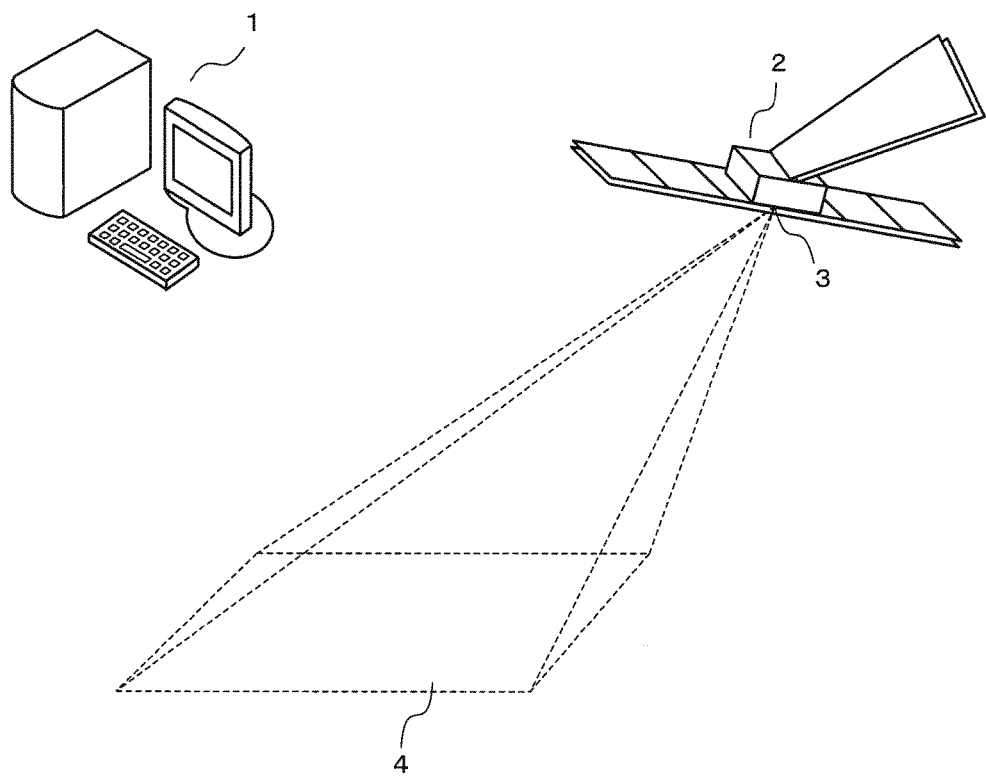
FIG. 1 is a block diagram illustrating a configuration example of an observation system of a first exemplary embodiment.

In the following, exemplary embodiments of the present invention will be described with reference to the drawings. FIG. 1 is a block diagram illustrating a configuration example of an observation system of a first exemplary embodiment of the present invention. The observation system illustrated in FIG. 1 includes a measuring point information providing device 1, and a synthetic aperture radar 3 mounted on a flying body 2 such as an artificial satellite, an aircraft or the like. In FIG. 1, the reference numeral 4 denotes a field of vision for image capturing (image capturing region) of an SAR image obtained by the synthetic aperture radar 3.

In the present exemplary embodiment, the synthetic aperture radar 3 has a multi-polarization observation mode enabling observation of scattered waves formed of four kinds of combinations of transmission and reception polarizations, i.e. an HH polarization, an HV polarization, a VH polarization and a VV polarization (hereinafter referred to as four basic polarization pairs) at generally the same place at generally the same time. Such a multi-polarization observation mode can be realized, for example, by the synthetic aperture radar 3 including at least one transmitter and two receivers, the transmitter alternately transmitting radio wave pulses of an H polarization and a V polarization and the two receivers (the receiver corresponding to the H polarization and the receiver corresponding to the V polarization) simultaneously receiving backscattering echoes of the respective radio wave pulses. In this manner, reflection intensities and relative phases obtained by the four basic polarization pairs are measured. A range meant here by "generally" in "generally the same place" and "generally the same time" may be any range in which observation data can be corrected by a correction function to data that can be considered to be observed at the same place at the same time. In practice, it represents a deviation in an irradiation place and a deviation in irradiation time corresponding to one cycle of a radio wave pulse in the above-described transmitter in many cases.

In the present invention, an SAR image generated from observation data formed of the four basic polarization pairs which are observed at generally the same place at the generally the same time, or information equivalent to such an SAR image will be referred to as an SAR image set.

In general, the information referred to as an SAR image includes information indicative of an amplitude of a reception electric field or a reflection intensity at a spot corresponding to each pixel and phase information which is information indicative of a phase of a received pulse. A square root of a reflection intensity corresponds to an amplitude of a reception electric field. In the following, information indicative of an amplitude of a reception electric field is also handled as information indicative of a reflection intensity in the present invention. Accordingly, as data associated with each pixel (also referred to as image information), an SAR image can be referred to, in other words, as an image having at least information indicative of a reflection intensity and a phase at a spot corresponding to each pixel. In an SAR image, data associated with each pixel will be referred to as SAR data. In the present invention, the SAR data is defined as information including information indicative of a reflection intensity and information indicative of a phase. The synthetic aperture radar 3 may execute predetermined correction processing with respect to a deviation in irradiation time or place in signal processing for generating SAR data. As accompanying information, the SAR image may include information about polarization used in transmission and reception, or observation conditions such as observation time, an incident angle and information about an orbit.

The SAR image set can have any data structure as long as it has an SAR image generated from observation data formed of the four basic polarization pairs which are observed at generally the same place at the generally the same time, or information equivalent to such an SAR image. For example, the SAR image set may be four SAR images each corresponding to any one of the transmission and reception polarization pairs, i.e. the four basic polarization pairs, or may be one SAR image in which each pixel is associated with four SAR data (e.g. information about four kinds of reflection intensities and phases) formed of the four basic polarization pairs.

The flying body 2 is mounted with a synthetic aperture radar system including the synthetic aperture radar 3. The synthetic aperture radar system includes, for example, the synthetic aperture radar 3, a signal processing unit, a storage unit which in time series stores SAR image sets obtained as a result of observation by the synthetic aperture radar 3, and an SAR image output unit which outputs the stored SAR image set or its time series data in a predetermined format in response to a request.

Figure 2:
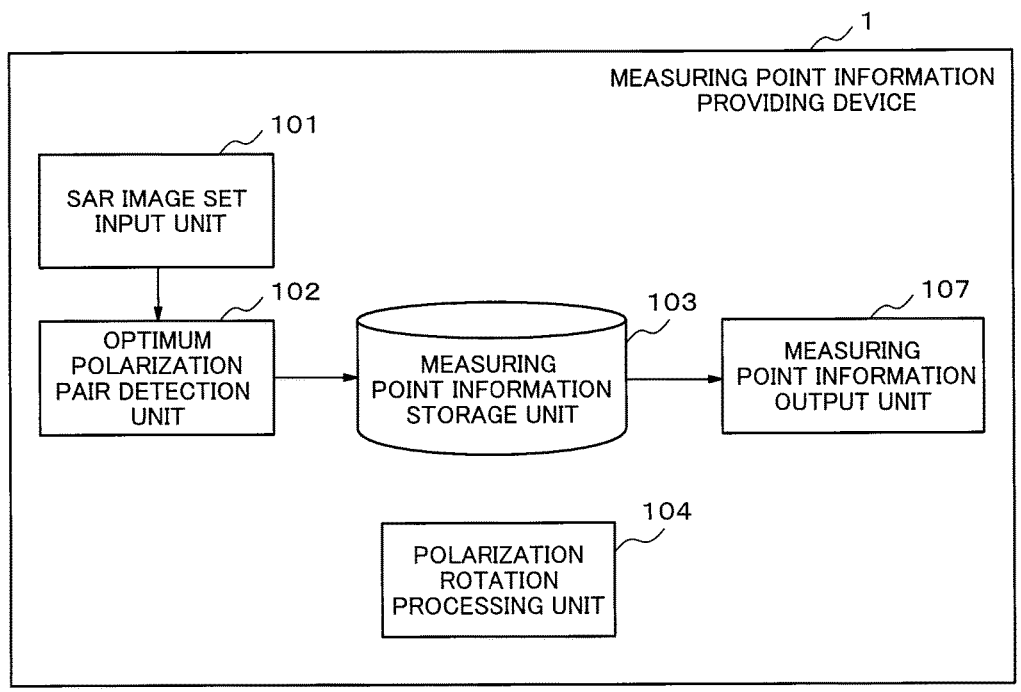
FIG. 2 is a block diagram illustrating a configuration example of a measuring point information providing device 1 of the first exemplary embodiment.

FIG. 2 is a block diagram illustrating a configuration example of the measuring point information providing device 1 of the present exemplary embodiment. The measuring point information providing device 1 illustrated in FIG. 2 includes an SAR image set input unit 101, an optimum polarization pair detection unit 102, a measuring point information storage unit 103, a polarization rotation processing unit 104, and a measuring point information output unit 107.

The SAR image set input unit 101 inputs at least one SAR image set which includes a specific region designated by a user in its field of vision for image capturing and which is generated from observation data acquired at generally the same place. In the following, a specific region may be referred to as a region of interest (ROI) in some cases.

Figure 3:
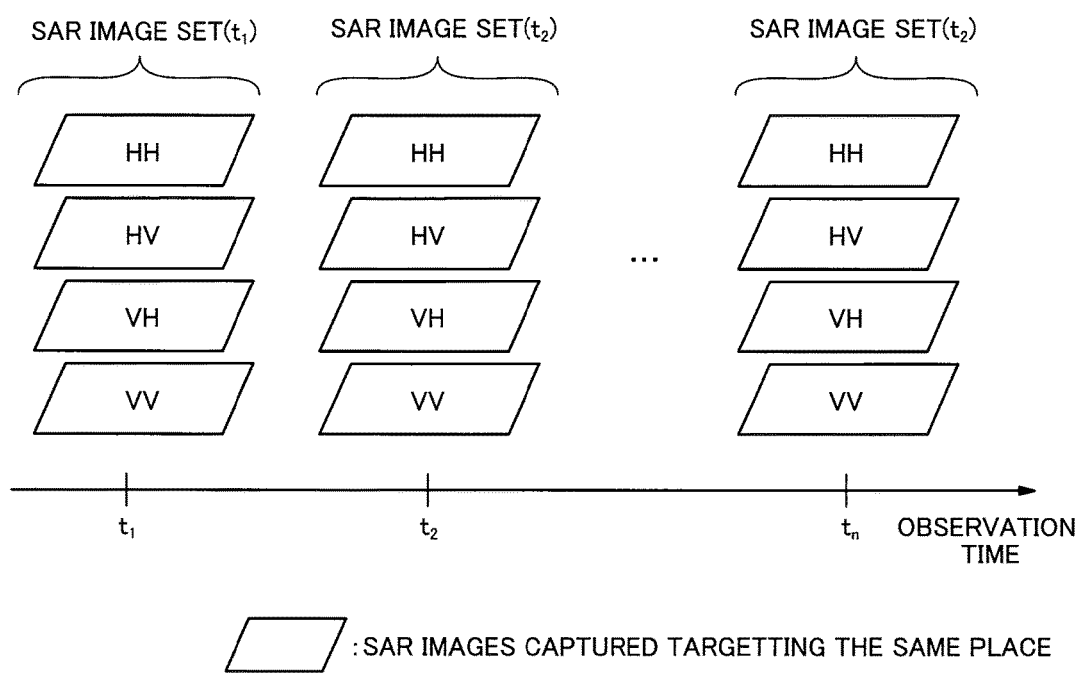
FIG. 3 is a diagram for explaining an example of an SAR image set to be input by an SAR image set input unit 101.

FIG. 3 is a diagram for explaining an example of SAR image set series input by the SAR image set input unit 101. For example, the SAR image set input unit 101 may input such an SAR image set series made up of one arbitrary set, or more sets selected from a number n of SAR image sets (e.g. several tens of pairs) having different observation times as illustrated in FIG. 3.

The SAR image set input unit 101 may, for example, directly receive an SAR image set or time series data of an SAR image set output by the SAR image output unit of the synthetic aperture radar system mounted on the flying body 2 to input an SAR image set series. In such a case, the SAR image set input unit 101 may be connected to the synthetic aperture radar system through a wired or wireless communication network to request a desired SAR image set or time series data of a desired SAR image set according to a predetermined format and receive the SAR image set or time series data of the SAR image set transmitted as a response. The SAR image set input unit 101 may be a common file input unit which according to user operation, inputs an SAR image set or time series data of an SAR image set acquired through connection to the synthetic aperture radar system by a user's predetermined method or a result of conversion of the time series data into a predetermined format.

Using at least one SAR image set input by the SAR image set input unit 101, the optimum polarization pair detection unit 102 detects an optimum polarization pair as a combination of optimum transmission and reception polarizations with respect to each target pixel. The optimum polarization pair detection unit 102 of the present exemplary embodiment detects an optimum polarization pair for each pixel using polarization rotation processing provided by the polarization rotation processing unit 104, which will be described later. An SAR image set for use in detecting an optimum polarization pair can be an SAR image set acquired at any time. A target pixel here may be, for example, each pixel included in an image region corresponding to a region of interest or a pixel designated by a user.

The optimum polarization pair detection unit 102 may, for example, determine one SAR image set for use in the optimum polarization pair detection processing from among the input SAR image sets and using the determined one SAR image set, calculate a reflection intensity of each predetermined candidate for an optimum polarization pair with respect to each pixel by the polarization rotation processing. Then, based on the calculation result of the reflection intensity of each candidate, an optimum polarization pair for the relevant pixel may be determined.

The polarization rotation processing, which is processing referred to also as polarization synthesis, is to acquire a reflection intensity obtained by an arbitrary transmission and reception polarization combination from SAR data (in particular, a reflection intensity and a relative phase) formed of four basic polarization pairs. Use of reflection intensities and relative phases obtained by an HH polarization, an HV polarization, a VH polarization and a VV polarization observed by the synthetic aperture radar at generally the same place at generally the same time enables acquisition of a complete scattering matrix of each resolution cell in the field of vision for image capturing 4 and enables calculation of complete polarization properties of each resolution from the scattering matrix. The resolution cell here is a section unit of the ground surface from which backscattering is observed by the synthetic aperture radar and corresponds to a pixel in an SAR image. The resolution cell is determined by a ground resolution of the synthetic aperture radar. When complete polarization properties of each pixel are obtained, a reflection intensity of an arbitrary combination of transmission and reception polarizations can be obtained based on the same.

Among examples of such information obtained from SAR data is polarimetric SAR data. The polarimetric SAR data is data which expresses a changed phase of scattered waves at the time of scattering.

Figure 4:
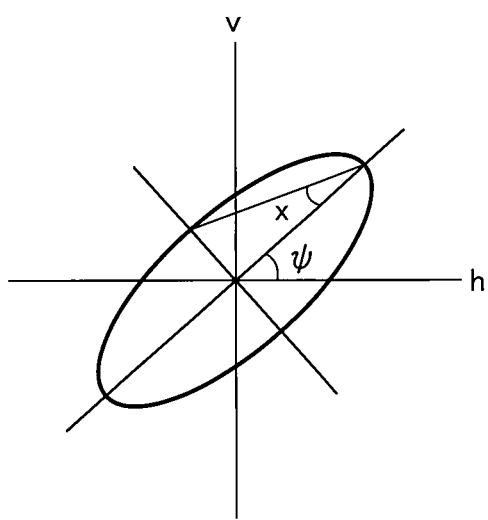
FIG. 4 is a diagram for explaining a polarization.

In the following, the polarization rotation processing will be briefly described. General expression of a polarization of a plane wave is an elliptical polarization, which can be described using an angle $\chi$ and an angle $\psi$ as illustrated in FIG. 4. The angle $\chi$ here represents roundness of an ellipse and the angle $\psi$ represents an angle from a horizontal direction of the line of apsides. A polarization vector $q_s$ of a scattered wave is expressed by the following Equation (1) using a polarization vector $q_t$ and a scattering matrix S of a transmission antenna.

[Equation 1]

$$q_s = Sq_t, \quad S = \begin{bmatrix} S_{hh} & S_{hv} \\ S_{vh} & S_{vv} \end{bmatrix} \quad (1)$$

The scattering matrix S is a complex matrix of 2×2 in which an incident polarization vector and a scattering polarization vector are associated with each other. An element $S_{ji}$ of the scattering matrix S represents an electric field magnitude and a phase change of a scattered wave of a polarization j relative to an incident wave of a polarization i. Each element of the scattering matrix S corresponds to SAR data of the four basic polarization pairs.

With $q_r$ as a polarization vector of the reception antenna, a complex amplitude V and a scattering power (reflection intensity) P of the reception electric field are represented by the following Equation (2), in which t on the left shoulder denotes a transposed matrix and * on the right shoulder denotes a complex conjugate.

$$V = q_r^t S q_t,$$

$$P = VV^* \quad (2)$$

When the scattering matrix S is obtained, a response (a complex amplitude V or a scattering power P of the reception electric field) with respect to an arbitrary combination of transmission and reception polarizations defined by $q_t$ and $q_r$ can be calculated.

A corresponding relationship between an incident wave and a scattered wave can be obtained using a Stokes vector in place of a polarization vector. For example, between a Stokes vector $G_t$ of the incident wave and a Stokes vector $G_r$ of the scattered wave, such a relationship as indicated in the following Equation (3) is established.

$$P = G_r^t F G_t \quad (3)$$

F represents a real matrix of 4×4 which is referred to as a Stokes matrix. The Stokes vectors Gt and Gr are four-dimensional vectors each formed of four Stokes parameters $G_0$, $G_1$, $G_2$, and $G_3$ indicated in the following Equation (4). $a_h$ and $a_v$ are an amplitude of a horizontal component $E_h$ and an amplitude of a vertical component $E_v$ of an electric field vector, respectively. $\delta$ represents a difference $(\delta_h - \delta_v)$ between a phase $\delta_h$ of $E_h$ and a phase $\delta_v$ of $E_v$. While a polarization vector is expressed by a complex number, a Stokes vector is expressed by a real number. Elements of the Stokes matrix F are obtained by a relationship known from the elements of the scattering matrix S, though not detailed here.

$$G_0 = a_h^2 + a_v^2,$$

$$G_1 = a_h^2 - a_v^2,$$

$$G_2 = 2a_h a_v \cos \delta,$$

$$G_3 = 2a_h a_v \sin \delta \quad (4)$$

Among methods for obtaining a scattering intensity with respect to an arbitrary combination of transmission and reception polarizations from such a scattering matrix S or a Stokes matrix F is, for example, the following method.

First, each element of the Stokes vectors $G_t$ and $G_r$ of a transmission and reception antenna in a transmission and reception polarization pair to be obtained is described with $\chi$ and $\psi$ of an elliptical polarization as indicated in the following Equation (5).

$$G_0 = 1.0,$$

$$G_1 = \cos(2\chi)\cos(2\psi),$$

$$G_2 = \cos(2\chi)\sin(2\psi),$$

$$G_3 = \sin(2\chi) \quad (5)$$

$\chi=0°$ represents a liner polarization, $|\chi|=45°$ represents a circular polarization, $\chi<0$ represents a clockwise polarization and $\chi>0$ represents a counterclockwise polarization. In addition, $\psi=0°$ represents a horizontal polarization and $\psi=90°$ represents a vertical polarization. A range of $\chi$ is $-45°$ to $45°$ and a range of $\psi$ is $0°$ to $180°$. For example, holding both $\chi=0°$ and $\psi=0°$ expresses a linear horizontal polarization and holding both $\chi=35°$ and $\psi=90°$ expresses a counterclockwise elliptical polarization whose line of apsides is in a horizontal direction.

Next, each element of a Stokes matrix F for a pixel in a target area is averaged to obtain a mean Stokes matrix F'.

Next, the Stokes vector $G_t$ of the transmission antenna, the Stokes vector $G_r$ of the reception antenna and the obtained mean Stokes matrix F are substituted in the above Equation (3) (F is replaced by F') to obtain the scattering power P. The reason for using the mean Stokes matrix F' as the Stokes matrix is for reducing speckle noise generated when measuring planarly distributed targets using coherent radio waves. Weightedly averaging a plurality of target Stokes matrices F to obtain the scattering power P here leads to a weighted average of the scattering powers P from the plurality of targets.

Such a method of obtaining the scattering power P from polarization properties and an arbitrary transmission and reception polarization pair as described above is also recited, for example, in the above-described Non-Patent Document 3.

When transmission and reception polarizations are changed, a target scattering intensity is changed by the polarizations. By using such polarization rotation processing, the optimum polarization pair detection unit 102 may detect, as an optimum polarization pair, a transmission and reception polarization pair candidate from which the highest reflection intensity is obtained among the respective candidates determined in advance for an optimum polarization pair.

A transmission and reception polarization pair to be a candidate for an optimum polarization pair is not particularly limited. Specifically, with respect to each of a transmission wave and a reception wave, a polarization can be arbitrarily set whose rotation angle is within a range of 0 to 180°. The rotation angle of a polarization here is a polarization angle of the polarization in question when a polarization angle of a horizontal polarization is set to be 0°. The rotation angle of a polarization corresponds to the angle $\psi$ indicated in FIG. 4 and in a case, for example, of an H polarization, the angle will be 0° and in a case of a V polarization, it will be 90°. In addition, 0° and 180° of the rotation angle represent the same polarization. A candidate optimum polarization pair may be, for example, a combination of transmission and reception linear polarizations which are rotated by 5° from 0° (horizontal) to 180°. In a case of the above example, with $\alpha_t$ as a rotation angle of a transmission polarization and $\alpha_r$ as a rotation angle of a reception polarization to express a combination thereof as $\{\alpha_t, \alpha_r\}$, optimum polarization pair candidates will be $\{\{\{0, 0\}, \ldots, \{0,175\}\}, \{\{5,0\}, \ldots, \{5,175\}\}, \ldots, \{\{175,0\}, \ldots, \{175,175\}\}\}$.

When two or more SAR image sets are used, the optimum polarization pair detection unit 102 may obtain a reflection intensity with respect to each candidate using each SAR image set to select, as an optimum polarization pair, a candidate having the highest average reflection intensity or a candidate whose average reflection intensity is not less than a predetermined value and whose reflection intensity varies least.

When as a result of obtaining reflection intensities with respect to all the candidates, no candidate has a reflection intensity not less than the predetermined value, the optimum polarization pair detection unit 102 may determine that there is no optimum polarization pair because a pixel in question is not appropriate as a measuring point.

When obtaining an optimum polarization pair, the optimum polarization pair detection unit 102 may, for example, first use two or more SAR image sets captured during a period when no change is assumed to occur to determine whether they have PS properties or not. For example, when a range of change of a relative phase during the above period by any one of transmission and reception polarization pairs as the four basic polarization pairs is equal to or larger than the predetermined value, the optimum polarization pair detection unit 102 may determine that there is no optimum polarization pair irrespective of determination based on the above-described reflection intensity because a pixel in question is not appropriate as a measuring point.

When optimum polarization pair detecting time reduction is required, the optimum polarization pair detection unit 102 may, for example, consider, as an optimum polarization pair, a combination of transmission and reception polarizations which will have a reflection intensity not less than the predetermined value among predetermined candidates for an optimum polarization pair. In such a case, the optimum polarization pair detection unit 102 may, for example, obtain a reflection intensity with respect to a plurality of provided optimum polarization pair candidates by polarization rotation processing in a predetermined order and consider a candidate whose reflection intensity attains the predetermined value first as an optimum polarization pair in a pixel in question. In the following, a combination of transmission and reception polarization rotation angles in the optimum polarization pair may be referred to as an optimum rotation angle pair in some cases. It can be said that determination of an optimum polarization pair by the optimum polarization pair detection unit 102 is determination of an optimum rotation angle pair.

The optimum polarization pair detection unit 102 generates measuring point information including information indicative of thus obtained optimum polarization pair in each pixel and stores the same in the measuring point information storage unit 103 which will be described later. The information indicative of an optimum polarization pair may be information including, for example, a transmission polarization rotation angle and a reception polarization rotation angle. When detecting no optimum polarization pair, information indicating to that effect is registered as information indicative of an optimum polarization pair.

The measuring point information is information about a measuring point in PS-InSAR and may be, for example, position information of a pixel or a spot corresponding to the pixel and information associated with information indicative of an optimum polarization pair. In addition to the position information and the information indicative of an optimum polarization pair, the measuring point information may include a reflection intensity (including an average reflection intensity) obtained by an optimum polarization pair which is obtained at the time of detection or information indicative of polarization properties (the scattering matrix S, the Stokes matrix F or the like). Further, optimum polarization pair detection time and date or information about an SAR image set used for detection may be included.

The measuring point information storage unit 103 stores measuring point information.

The polarization rotation processing unit 104, which is a means that provides the polarization rotation processing, uses at least one SAR image set to calculate a reflection intensity obtained by a designated combination of transmission and reception polarizations in a designated pixel.

The measuring point information output unit 107 outputs measuring point information stored in the measuring point information storage unit 103. The measuring point information output unit 107 may, for example, generate and output information indicating whether each spot corresponding to a target pixel is appropriate as a measuring point or not or indicating to which degree the spot is appropriate as a measuring point based on the measuring point information stored in the measuring point information storage unit 103.

For example, the measuring point information output unit 107 may generate an rotational SAR image based on an input SAR image set and the measuring point information and output the generated rotational SAR image as information indicating to which degree each spot corresponding to a target pixel is appropriate as a measuring point.

The rotational SAR image here is an image holding at least rotational SAR data as SAR data formed of an optimum polarization pair of a target pixel at least so as to be associated with the target pixel. Unlike an ordinary SAR image, the rotational SAR image is an image in which a combination of transmission and reception polarizations can differ with each pixel. Output of a rotational SAR image in which each pixel holds SAR data formed of an optimum polarization pair leads to displaying of a reflection intensity image formed of an optimum polarization pair of each pixel at an output destination.

With respect at least to a target pixel, regardless of a data structure of the image, the measuring point information output unit 107 may generate and output information including position information of the pixel or of a spot corresponding to the pixel, information indicative of an optimum polarization pair at the pixel, and rotational SAR data. In such a case, necessary information may be selected and displayed in an image format at an output destination.

In addition, the measuring point information output unit 107 may generate and output information including information indicative of polarization properties of each pixel (scattering matrix S, Stokes matrix F, etc.). This enables generation of rotational SAR data at arbitrary time at an output destination.

In the present exemplary embodiment, the SAR image set input unit 101 is realized, for example, by a data input device and a computer system operable according to a program. The optimum polarization pair detection unit 102 and the polarization rotation processing unit 104 are realized, for example, by a computer system operable according to a program. The measuring point information storage unit 103 is realized, for example, by a storage device. The measuring point information output unit 107 is realized, for example, by a data output device and a computer system operable according to a program.

Figure 5:
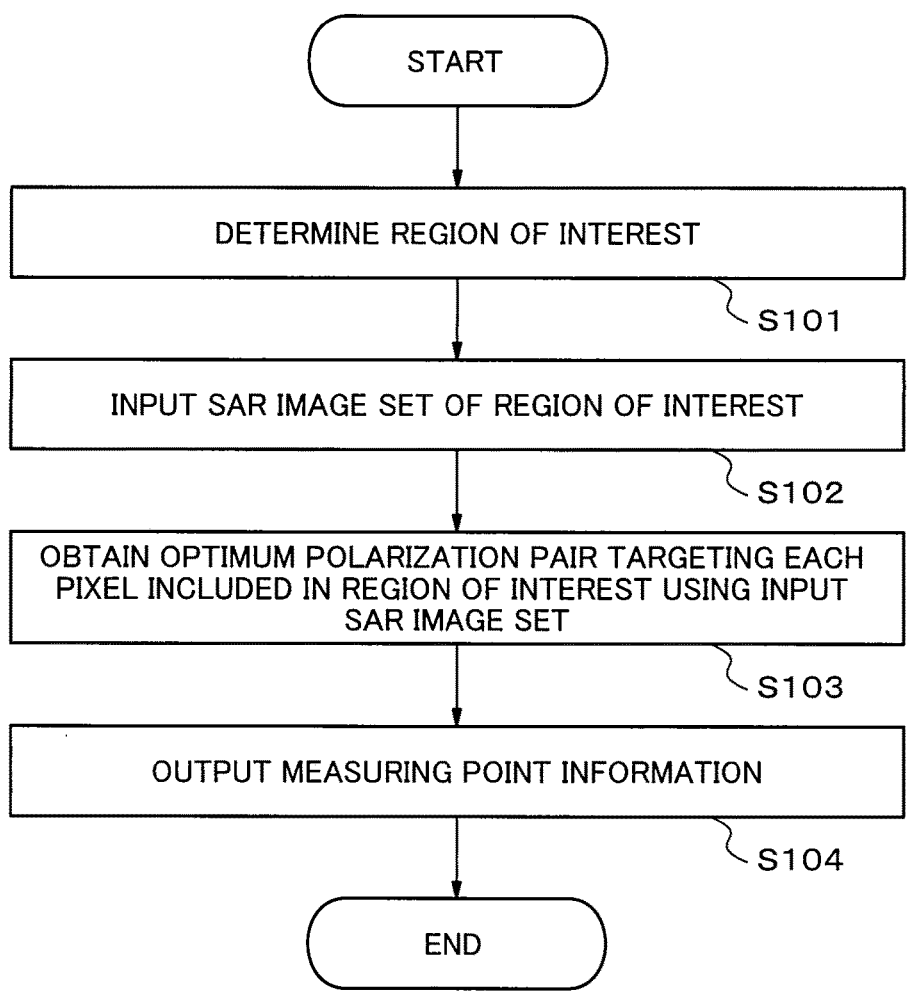
FIG. 5 is a flowchart illustrating one operation example of the measuring point information providing device 1 of the first exemplary embodiment.

Next, operation of the present exemplary embodiment will be described. FIG. 5 is a flowchart illustrating one operation example of the measuring point information providing device 1 of the present exemplary embodiment. FIG. 5 illustrates an operation example of the measuring point information providing device 1 which with respect to all the pixels included in an image region of an SAR image corresponding to a region of interest, obtains an optimum polarization pair to provide measuring point information obtained as a result.

In the present example, first, a user is caused to determine a region of interest (Step S101). The measuring point information providing device 1 may, for example, have a user interface such as a region of interest designating screen for designating a region of interest and cause a user to input information about a region of interest through the user interface. The information about a region of interest may be, for example, a latitude and a longitude and a radius of a central spot or the like. It is also possible, for example, to display a map on which the field of vision for image capturing 4 of the synthetic aperture radar 3 is mapped and cause a user to designate a range of a region of interest or the like on the map. In the present example, all the pixels included in an image region of an SAR image corresponding to a region of interest are assumed to be target pixels.

Next, the SAR image set input unit 101 inputs at least one SAR image set including the region of interest in its field of vision for image capturing (Step S102).

Next, the optimum polarization pair detection unit 102 executes polarization rotation processing using the input SAR image set to detect an optimum polarization pair of a target pixel (Step S103). The optimum polarization pair detection unit 102 also generates measuring point information including information indicative of the detected optimum polarization pair of the target pixel and stores the same in the measuring point information storage unit 103.

Lastly, the measuring point information output unit 107 outputs measuring point information stored in the measuring point information storage unit 103 (Step S104). The measuring point information output unit 107 may, for example, output measuring point information according to a user's request. The measuring point information output unit 107 may output a rotational SAR image generated based on the measuring point information in place of or in addition to the measuring point information.

A described in the foregoing, according to the present exemplary embodiment, a group of measuring points at which displacement can be measured is detected to provide a user with information of the detected measuring points before executing PS-InSAR, so that the user is allowed to easily find such a measuring point as cannot be found only by watching an SAR image formed of a specific transmission and reception polarization combination. In addition, for example, by designating a measuring point based on the information by a user or collating the information with information of displacement obtained by executing the PS-InSAR, a result of more accurate detection with higher sensitivity can be obtained.

Although in the above description, an example has been recited where the measuring point information providing device 1 includes the polarization rotation processing unit 104, the polarization rotation processing unit 104 may be omitted when optimum polarization pair candidates in the optimum polarization pair detection unit 102 are assumed to be only four basic polarization pairs, an HH polarization, an HV polarization, a VH polarization and a VV polarization.

In such a case, the optimum polarization pair detection unit 102 may just use at least one input SAR image set to detect (select) an optimum polarization pair from among the four basic polarization pairs for each pixel. The optimum polarization pair detection unit 102 may, for example, just use one SAR image set to compare reflection intensities indicated by SAR data each formed of the four basic polarization pairs of a target pixel included in the SAR image set and select a polarizations pair having the highest reflection intensity from among the four basic polarization pairs, thereby considering the same as an optimum polarization pair. Similarly, when a plurality of SAR image sets are used, it is possible to select a polarization pair having the highest average reflection intensity indicated by each of the SAR data formed of the four basic polarization pairs of the target pixel included in the SAR image set, or a polarization pair whose average reflection intensity is not less than a predetermined value and whose reflection intensity varies least.

Exemplary Embodiment 2

Figure 6:
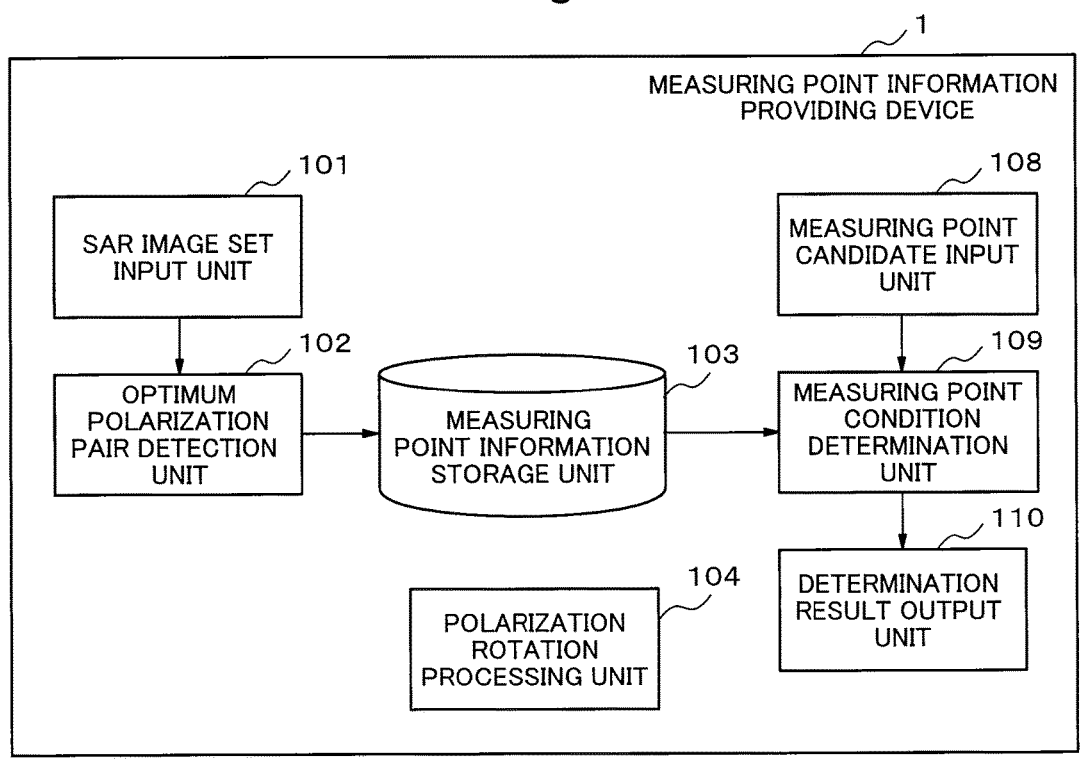
FIG. 6 is a block diagram illustrating a configuration example of a measuring point information providing device 1 of a second exemplary embodiment.

Next, a second exemplary embodiment of the present invention will be described. FIG. 6 is a block diagram illustrating a configuration example of a measuring point information providing device 1 of the second exemplary embodiment of the present invention. The measuring point information providing device 1 illustrated in FIG. 6 differs from the measuring point information providing device 1 of the first exemplary embodiment illustrated in FIG. 2 in including a measuring point candidate input unit 108, a measuring point condition determination unit 109 and a determination result output unit 110 in place of the measuring point information output unit 107.

The measuring point candidate input unit 108 inputs at least one candidate for a spot (measuring point) at which the user particularly wants to measure displacement within a region of interest. The measuring point candidate input unit 108 may, for example, have a user interface such as a measuring point designating screen for designating a measuring point candidate and cause a user to input information of a measuring point candidate through the user interface. The information of a measuring point candidate may be, for example, information indicative of a position on the ground surface (latitude and longitude etc.) or pixel coordinates in an SAR image included in an acquired SAR image set. The measuring point information providing device 1 of the present example is assumed to hold information indicative of a corresponding relationship between a position on the ground surface and a pixel position in the SAR image.

In the present exemplary embodiment, a pixel corresponding to a designated measuring point candidate is assumed to be a target pixel.

The measuring point condition determination unit 109 determines whether an input measuring point candidate is appropriate as a measuring point or not. The measuring point condition determination unit 109 refers to a spot assumed to be the designated measuring point candidate (hereinafter referred to as a candidate point) or measuring point information associated with a pixel corresponding to the candidate point to determine whether displacement can be measured at the candidate point, with SAR data (information about a reflection intensity or a phase) formed of an optimum polarization pair of a target pixel which is a pixel corresponding to the candidate point as a reference. Specifically, the measuring point condition determination unit 109 may just determine whether the candidate point satisfies predetermined conditions for a preferable measuring point or not based on the measuring point information. When the measuring point information corresponding to the candidate point is not registered at the measuring point information storage unit 103, the measuring point condition determination unit 109 may request the optimum polarization pair detection unit 102 to execute processing of detecting an optimum polarization pair with respect to a target pixel by using a latest SAR image set.

For example, when as information indicative of an optimum polarization pair at a candidate point in question indicated by the measuring point information, information to the effect that no optimum polarization pair is found is registered, the measuring point condition determination unit 109 may determine that the candidate point is not appropriate as a measuring point.

For example, when a reflection intensity obtained by an optimum polarization pair at a candidate point in question indicated by the measuring point information is not less than a predetermined value, the measuring point condition determination unit 109 may determine that the candidate point is appropriate as a measuring point.

The determination result output unit 110 outputs a determination result obtained by the measuring point condition determination unit 109.

In the present exemplary embodiment, the measuring point candidate input unit 108 is realized, for example, by a data input device and a computer system operable according to a program. The measuring point condition determination unit 109 is also realized, for example, by a computer system operable according to a program. The determination result output unit 110 is also realized, for example, by a data output device and a computer system operable according to a program.

Figure 7:
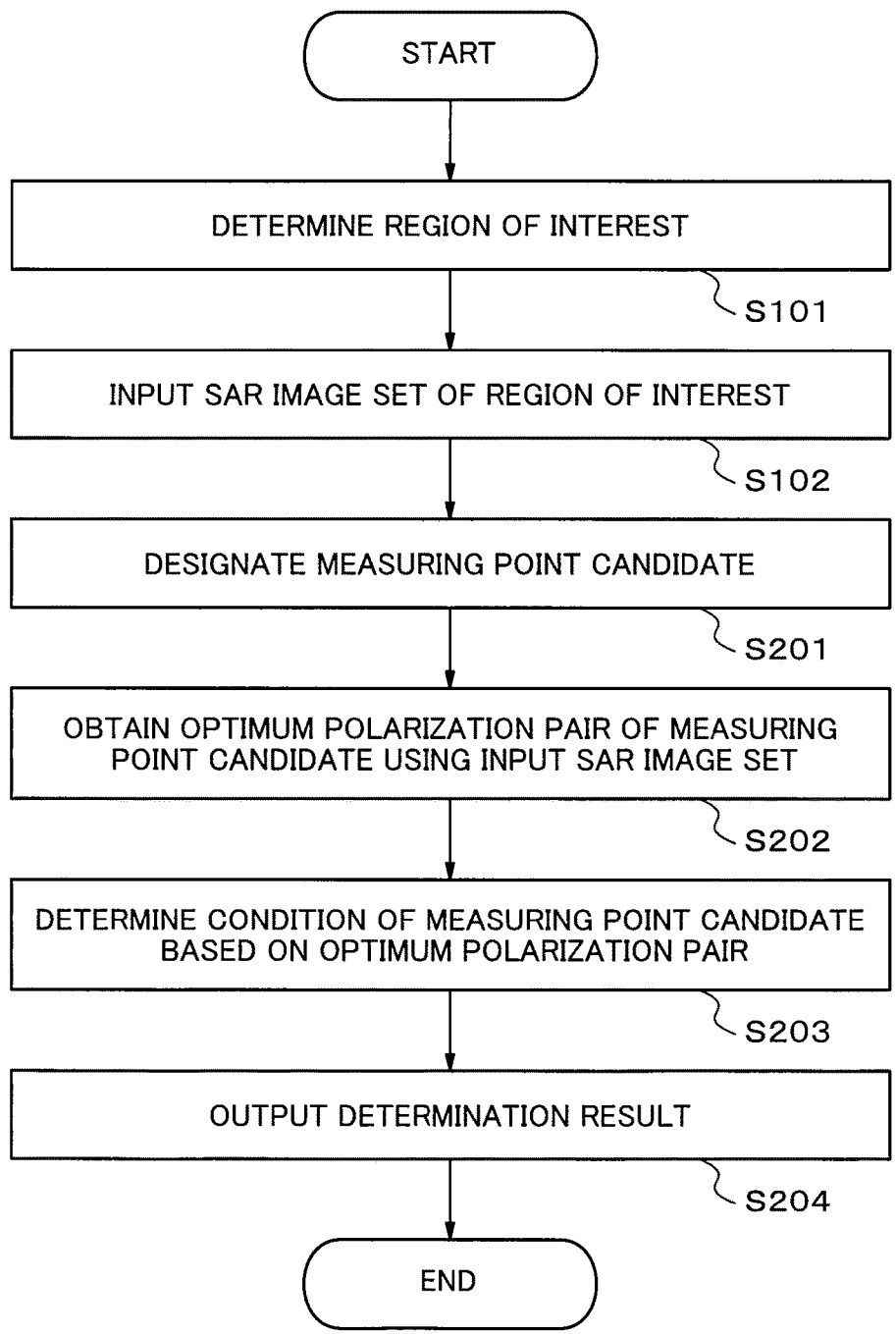
FIG. 7 is a flowchart illustrating one operation example of the measuring point information providing device 1 of the second exemplary embodiment.

Next, operation of the present exemplary embodiment will be described. FIG. 7 is a flowchart illustrating one operation example of the measuring point information providing device 1 of the present exemplary embodiment. Since processing at Steps S101 and S102 is the same as that of the example illustrated in FIG. 5, description thereof will be omitted.

In the present example, when the SAR image set input unit 101 inputs at least one SAR image set including a region of interest in its field of vision for image capturing (Step S102), the measuring point candidate input unit 108 causes a user to designate at least one candidate for a measuring point (Step S201).

Next, the optimum polarization pair detection unit 102 executes polarization rotation processing using at least one input SAR image set to detect an optimum polarization pair of a target pixel corresponding to spot (candidate point) assumed to be a measuring point candidate (Step S202). The optimum polarization pair detection unit 102 also generates measuring point information including information indicative of the detected optimum polarization pair of the target pixel and stores the same in the measuring point information storage unit 103.

Next, the measuring point condition determination unit 109 determines whether a designated candidate point satisfies predetermined conditions as measuring point conditions based on the measuring point information (Step S203). Here, the measuring point condition determination unit 109 determines whether the candidate point is appropriate as a measuring point, with SAR data formed of an optimum polarization pair of a target pixel corresponding to the candidate point as a reference.

Lastly, the determination result output unit 110 outputs the determination result obtained by the measuring point condition determination unit 109 (Step S204).

A described in the foregoing, since according to the present exemplary embodiment, it is possible to easily find whether a spot at which a user wants to measure displacement is appropriate as a measuring point or not before executing PS-InSAR, the user is allowed to execute change detection processing efficiently. For example, when a point whose change is to be detected is determined to some extent, the user may designate the point or a spot near the point to determine whether it is appropriate as a measuring point or not, thereby designating a measuring point based on the determination result. At this time, as SAR data corresponding to the spot in question, inputting information equivalent to SAR data formed of optimum polarization pairs at times before and after a period when a change is to be detected based on information of an optimum polarization pair at the spot in question and executing PS-InSAR leads to change detection with high accuracy. Information equivalent to SAR data formed of optimum polarization pairs at times before and after a period when a change is to be detected can be generated by executing the above polarization rotation processing or the like using SAR data formed of four basic polarization pairs at the time in question.

Exemplary Embodiment 3

Figure 8:
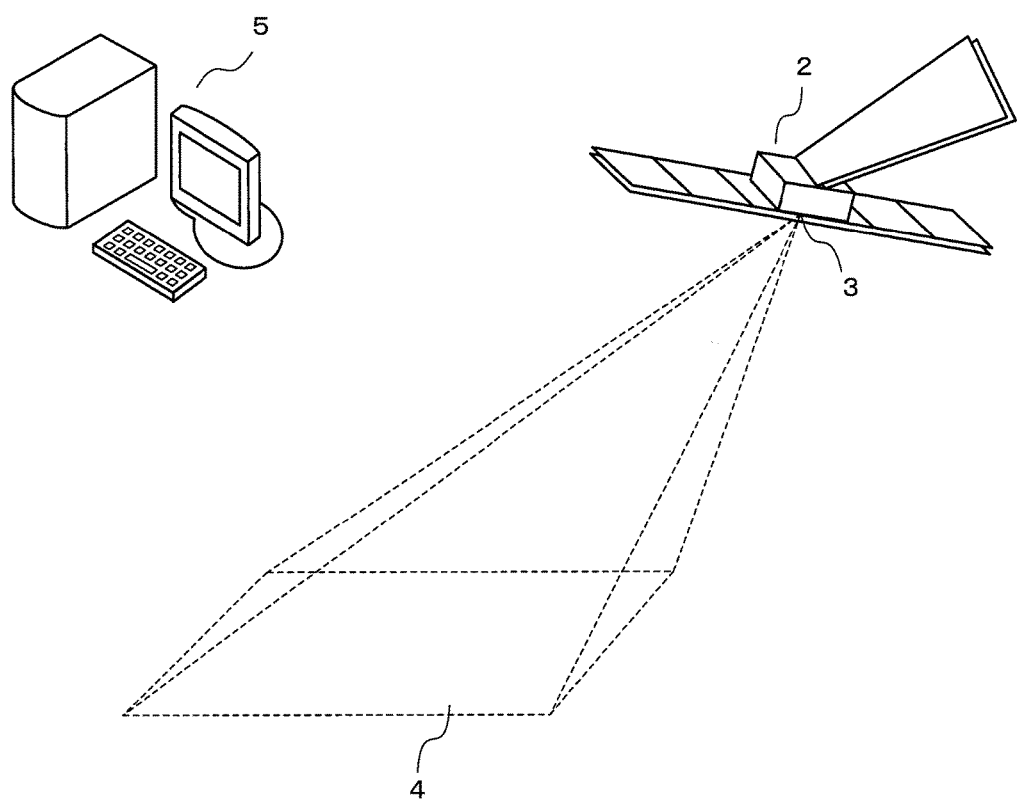
FIG. 8 is a diagram illustrating a configuration example of an observation system of a third exemplary embodiment.

Next, a third exemplary embodiment of the present invention will be described. FIG. 8 is a diagram illustrating a configuration example of an observation system of the present exemplary embodiment. The observation system illustrated in FIG. 8 differs from the first exemplary embodiment shown in FIG. 1 in including a change detection device 5 in place of the measuring point information providing device 1.

Figure 9:
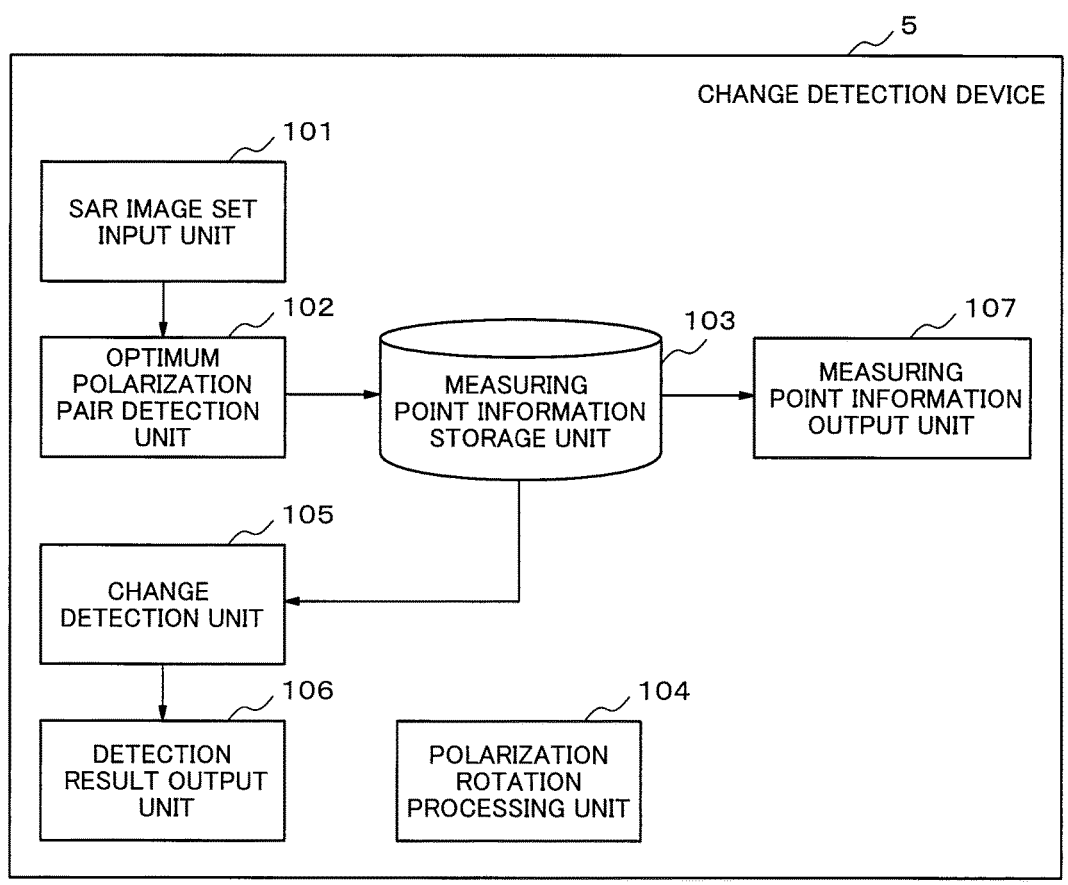
FIG. 9 is a block diagram illustrating a configuration example of a change detection device 5.

FIG. 9 is a block diagram illustrating a configuration example of the change detection device 5. As illustrated in FIG. 9, the change detection device 5 further includes a change detection unit 105 and a detection result output unit 106 in addition to the components of the measuring point information providing device 1 of the first exemplary embodiment illustrated in FIG. 2 (the SAR image set input unit 101, the optimum polarization pair detection unit 102, the measuring point information storage unit 103, the polarization rotation processing unit 104 and the measuring point information output unit 107).

In the present exemplary embodiment, the SAR image set input unit 101 inputs at least two SAR image sets whose observation times are different from each other. The SAR image set input here includes at least SAR image sets corresponding to times before and after a time period designated by a user as a period when a change is to be detected. In the following, times before and after a time period designated by a user as a period when a change is to be detected may be referred to as designated time in some cases. A time period is not limited to one. In addition, at least two SAR image sets input by the SAR image set input unit 101 may be referred to as an "SAR image set series" in some cases in a sense of a set of SAR image sets generated from observation data whose observation times at generally the same place are different from each other.

For example, the SAR image set input unit 101 may input such an SAR image set series made up of a number n of SAR image sets (e.g. several tens of sets) having different observation times as illustrated in FIG. 3.

The change detection unit 105 detects a change at least at a spot corresponding to a target pixel based on the measuring point information stored in the measuring point information storage unit 103 and an input SAR image set series. The target pixel here is, for example, each pixel included in an image region corresponding to a region of interest or a pixel designated as a spot (measuring point) at which displacement is to be measured in particular within the region of interest.

The detection result output unit 106 outputs a detection result obtained by the change detection unit 105.

The optimum polarization pair detection unit 102, the measuring point information storage unit 103, the polarization rotation processing unit 104 and the measuring point information output unit 107 may be the same as those of the first exemplary embodiment.

Figure 10:
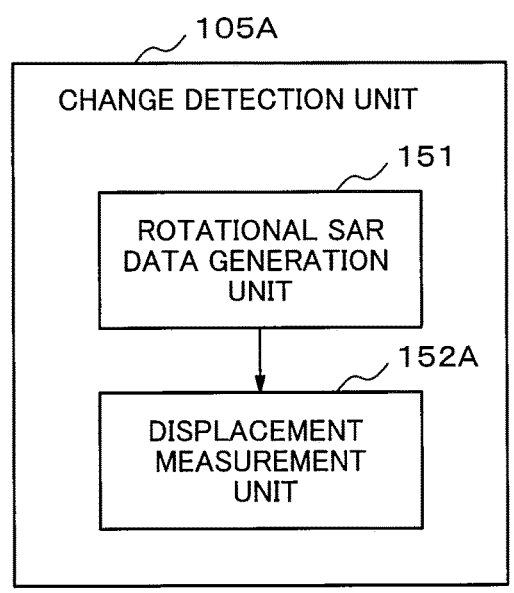
FIG. 10 is a block diagram illustrating one example of a change detection unit 105.

In the following, the change detection unit 105 of the present exemplary embodiment will be described in more detail. FIG. 10 is a block diagram illustrating one example of the change detection unit 105. A change detection unit 105A illustrated in FIG. 10 includes a rotational SAR data generation unit 151 and a displacement measurement unit 152A.

The rotational SAR data generation unit 151 generates rotational SAR data corresponding to at least two different times with respect to each target pixel based on an optimum polarization pair of a target pixel indicated by the measuring point information stored in the measuring point information storage unit 103 and an SAR image set at designated time included in an input SAR image set series.

As described above, the rotational SAR data is SAR data formed of an optimum polarization pair of a pixel in question at certain time (each time included in the designated time here).

For example, the rotational SAR data generation unit 151 may generate, with respect to a target pixel, rotational SAR data corresponding to designated time (to be more specific, each time included in the designated time), for example, by using the polarization rotation processing provided by the polarization rotation processing unit 104. In the following, the rotational SAR data corresponding to designated time of a target pixel which is generated by the rotational SAR data generation unit 151 will be referred to as a "rotational SAR data series" of a target pixel in some cases in a sense of a set of rotational SAR data generated from pieces of observation data whose observation times of the target pixel are different.

The rotational SAR data generation unit 151 is capable of generating a rotational SAR data series with respect to each target pixel, for example, by executing, for each target pixel, the polarization rotation processing with a designated optimum polarization pair at each time included in designated time using an SAR image set of the designated time included in an SAR image set series.

When an optimum polarization pair is any of the four basic polarization pairs, as the rotational SAR data, SAR data included in an input SAR image set may be used as it is.

The displacement measurement unit 152A measures displacement at a spot corresponding to a target pixel using a rotational SAR data series for the target pixel. More specifically, the displacement measurement unit 152A calculates a phase difference caused by a change at the spot corresponding to the target pixel using the rotational SAR data series for the target pixel in PS-InSAR processing. In the PS-InSAR processing, displacement at the spot corresponding to the target pixel can be measured by obtaining a phase difference caused by a change while removing a phase difference caused by a height from among phase differences appearing between SAR data of the target pixel to be compared.

For example, when an SAR image set series including a number n of SAR image sets is input and each time when each of the number n of the SAR image sets is acquired is designated as designated time, a rotational SAR data series including the number n of the rotational SAR data each corresponding to any of times t1 to tn is input to the displacement measurement unit 152A for each one target pixel.

In such a case, as information indicative of displacement between designated times of the target pixel, the displacement measurement unit 152A may output, for example, a maximum value of phase differences appearing between the first time and each of the subsequent times, a cumulative total value of the phase differences appearing between adjacent times, or the like. Specifically, a phase difference appearing between rotational SAR data corresponding to time t1 and rotational SAR data corresponding to each of the time t2 to tn may be obtained to output the largest value of the obtained phase differences as information indicative of displacement between designated times of the target pixel. In addition, the displacement measurement unit 152A may, for example, obtain a phase difference appearing between the rotational SAR data corresponding to time t1 and the rotational SAR data corresponding to time t2, a phase difference appearing between the rotational SAR data corresponding to time t2 and the rotational SAR data corresponding to time t3, . . . a phase difference appearing between the rotational SAR data corresponding to time t(n−1) and the rotational SAR data corresponding to time tn, thereby outputting a cumulative total value (the upper limit is set to be 2n) of the obtained phase differences as information indicative of displacement between the designated times of the target pixel.

In this case, the detection result output unit 106 may output information indicative of displacement between the designated times of each target pixel which is output from the displacement measurement unit 152A as information indicative of a detection result of a change at a spot corresponding to each target pixel.

The detection result output unit 106 may generate and display a differential interference image based on the information indicative of displacement between the designated times of each target pixel which is output from the displacement measurement unit 152A. The differential interference image is an image which holds, at least so as to be associated with each target pixel, information about a phase difference caused by a change at a spot corresponding to the target pixel or pixel information corresponding to an amount of the phase difference. This enables color-coding of each pixel according to an amount of displacement at a spot corresponding to the pixel when a differential interference image is displayed at an output destination. With respect to other pixels than a target pixel in a differential interference image to be generated, the detection result output unit 106 may hold information to the effect that the pixel is not a measurement target or that it has no displacement.

Figure 11:
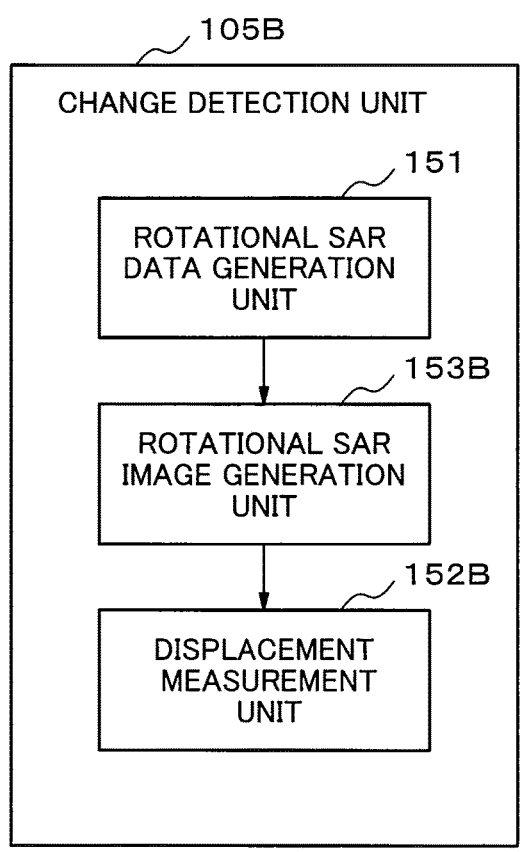
FIG. 11 is a block diagram illustrating another example of the change detection unit 105.

FIG. 11 is a block diagram illustrating another example of the change detection unit 105. A change detection unit 105B illustrated in FIG. 11 includes a rotational SAR data generation unit 151, a rotational SAR image generation unit 153B and a displacement measurement unit 152B.

The rotational SAR data generation unit 151 is the same as the rotational SAR data generation unit 151 of the change detection unit 105A illustrated in FIG. 10.

The rotational SAR image generation unit 153B integrates generated rotational SAR data series for the respective target pixels to generate a rotational SAR image corresponding to each designated time.

With respect to other pixel than a target pixel in each rotational SAR image, the rotational SAR image generation unit 153B may hold rotational SAR data to the effect that the pixel is invalid or in which its reflection intensity is set to be zero, or, for example, may select and hold SAR data formed of any one transmission and reception polarization pair of the four basic polarization pairs at time in question which are included in the SAR image set series.

Using rotational SAR images generated corresponding to a plurality of times, the displacement measurement unit 152B measures displacement at a spot corresponding at least to a target pixel to generate a differential interference image indicative of a measurement result. The displacement measurement unit 152B may just execute, for example, the same processing as the PS-InSAR processing using SAR images corresponding to the plurality of times.

While in the above-described displacement measurement unit 152A, input data is a rotational SAR data series which is pixel-based data and output data is information indicative of a pixel-based measurement result, the displacement measurement unit 152B differs in that input data is a rotational SAR image which is image-based data and output data is a differential interference image which is an image-based measurement result. Thus, a format of input/output data to/from the displacement measurement unit can be selected.

In the present exemplary embodiment, the change detection unit 105 is realized, for example, by a computer system operable according to a program. In addition, the detection result output unit 106 is realized, for example, by a data output device and a computer system operable according to a program.

Figure 12:
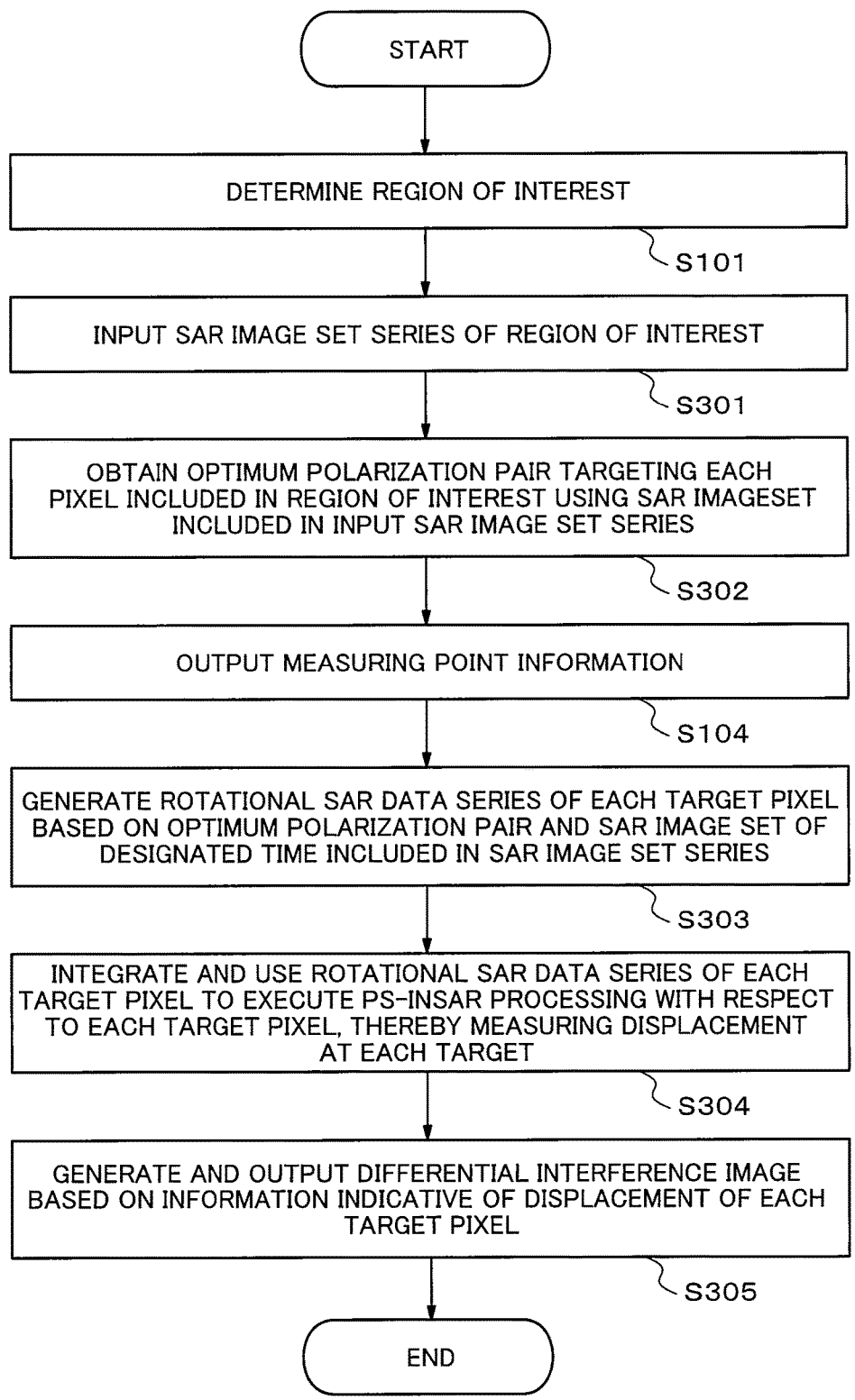
FIG. 12 is a flowchart illustrating one operation example of a change detection device 5 of a third exemplary embodiment.

Next, operation of the present exemplary embodiment will be described. FIG. 12 is a flowchart illustrating one operation example of the change detection device 5 of the present exemplary embodiment. FIG. 12 illustrates an example of operation of the change detection device 5 for detecting distortion or the like of a target object by displacement measurement with respect to all the pixels included in an image region of an SAR image corresponding to a region of interest. In the present example, description will be made of a case, as an example, where the change detection device 5 includes the change detection unit 105A illustrated in FIG. 10 as the change detection unit 105. In the following, since Step S101 is the same as those of the examples illustrated in FIG. 5 and FIG. 7, description thereof is omitted.

Also in the present example, all the pixels included in the image region of the SAR image corresponding to the region of interest are assumed to be target pixels.

In the present example, when a user is caused to determine a region of interest (Step S101), next, the SAR image set input unit 101 inputs an SAR image set series including SAR image sets acquired at different times with respect to a region including the region of interest (Step S301).

Next, the optimum polarization pair detection unit 102 executes the polarization rotation processing with respect to each of the target pixels using at least one SAR image set included in the input SAR image set series, thereby detecting an optimum polarization pair for each target pixel (Step S302). The optimum polarization pair detection unit 102 also generates measuring point information including information indicative of the obtained optimum polarization pair of each target pixel and stores the same in the measuring point information storage unit 103.

Next, the measuring point information output unit 107 outputs the measuring point information stored in the measuring point information storage unit 103 (Step S104). The measuring point information output unit 107 may, for example, output the measuring point information according to a user's request. The measuring point information output unit 107 may also output a rotational SAR image generated based on the measuring point information in place of or in addition to the measuring point information.

Next, the rotational SAR data generation unit 151 of the change detection unit 105 generates a rotational SAR data series of each target pixel based on the optimum polarization pair of each target pixel indicated by the measuring point information and an SAR image set corresponding to designated time included in the SAR image set series (Step S303).

Next, the displacement measurement unit 152A of the change detection unit 105 measures displacement at a spot corresponding to each target pixel by executing the PS-InSAR processing with respect to each target pixel using the generated rotational SAR data series of each target pixel (Step S304). The displacement measurement unit 152A, for example, here outputs information indicative of the displacement occurring between designated times of each target pixel which is obtained as a result of measurement. With respect to some target pixel, a reflection intensity is too low to obtain information of a phase difference, so that a condition for a measuring point is not satisfied and information indicative of being immeasurable is accordingly output in some cases.

Lastly, the detection result output unit 106 generates a differential interference image based on the information obtained at Step S304 and outputs the generated differential interference image as information indicative of a result of change detection in the region of interest (Step S305).

The processing at Step S104 may be executed after Step S303. For example, the measuring point information or the rotational SAR image may be output together with the output of a differential interference image by Step S305.

Figure 13:
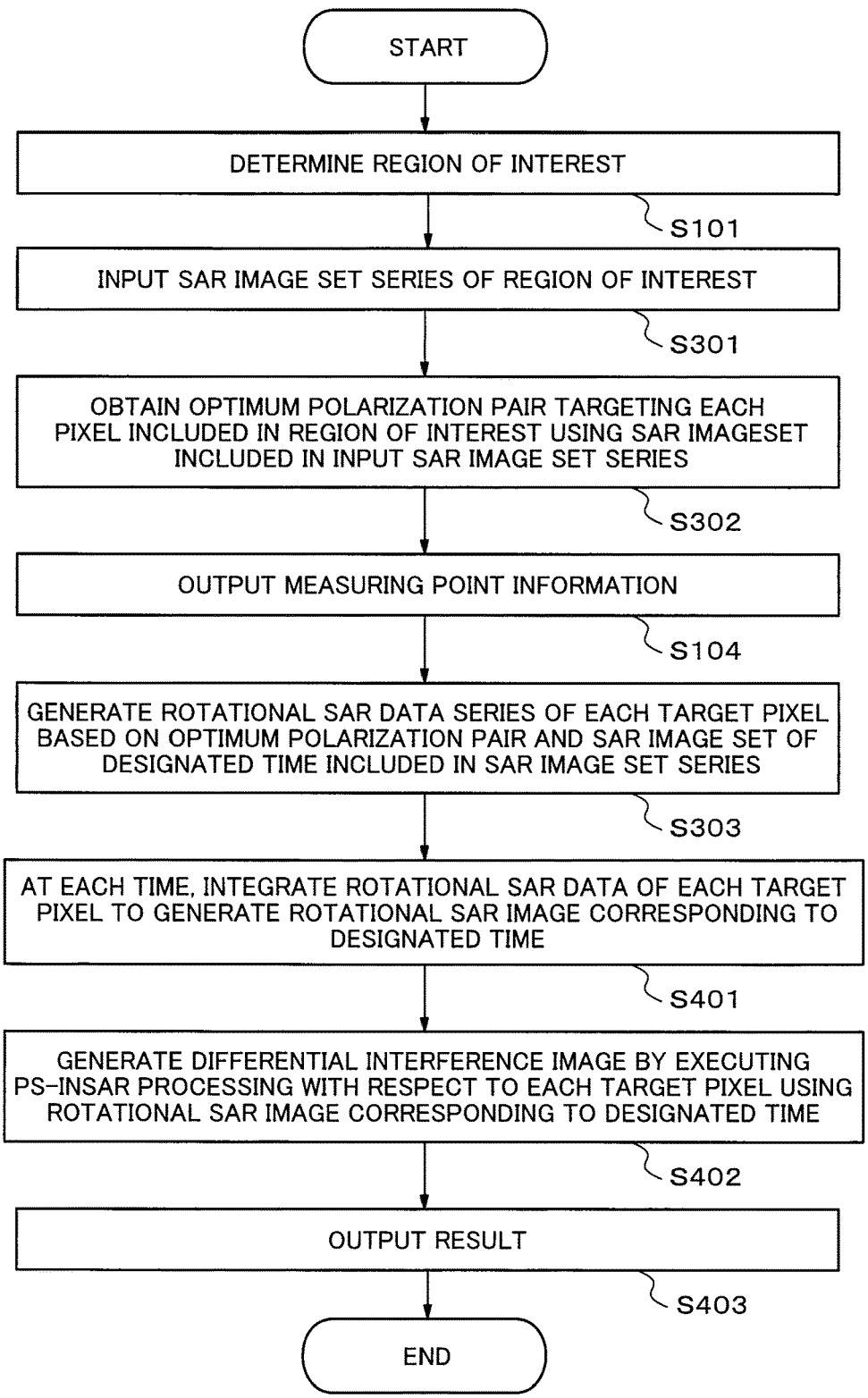
FIG. 13 is a flowchart illustrating another operation example of the change detection device 5 of the third exemplary embodiment.

FIG. 13 is a flowchart illustrating another operation example of the change detection device 5 of the present exemplary embodiment. FIG. 13 illustrates an operation example of the change detection device 5 for detecting distortion or the like of a target object by executing displacement measurement with respect to all the pixels included in an image region of an SAR image corresponding to a region of interest. In the present example, description will be made of a case, as an example, where the change detection device 5 includes the change detection unit 105B as illustrated in FIG. 11 as the change detection unit 105.

Since processing at Steps S101 to S303 is the same as in the example illustrated in FIG. 12, no description will be made thereof.

Also in the present example, all the pixels included in an image region of an SAR image corresponding to a region of interest are assumed to be target pixels.

In the present example, when the rotational SAR data generation unit 151 of the change detection unit 105 generates a rotational SAR data series of each target pixel (Step S303), at each time included in the designated time, the rotational SAR image generation unit 153B integrates rotational SAR data corresponding to the time in question which is included in a rotational SAR data series of each target pixel to generate a rotational SAR image corresponding to the designated time (Step S401).

Next, the displacement measurement unit 152B of the change detection unit 105 generates a differential interference image by executing the PS-InSAR processing using the generated rotational SAR image corresponding to the designated time (Step S402).

Lastly, the detection result output unit 106 outputs the differential interference image obtained at Step S402 as information indicative of at least a result of change detection in the region of interest (Step S403).

As described in the foregoing, the present exemplary embodiment enables a user to find whether each pixel included in a region of interest is appropriate as a measuring point or not and also enables detection of a change using all the spots allowing measurement which are included in a region of interest. This is the very evidence that the present invention improves change detection sensitivity. Further, outputting a change detection result in a form of a differential interference image enables spontaneous detection of a spot where a change occurred in the region of interest, thereby increasing visual confirmability of a detection result.

In addition, as in such methods as illustrated in FIG. 12 and FIG. 13, outputting a change detection result in a form of a differential interference image increases visual confirmability of a detection result by, for example, spontaneous detection of a spot where a change has occurred in the region of interest. In place of or in addition to the measuring point information, outputting a rotational SAR image enables a user to compare a differential interference image with the rotational SAR image, thereby enabling a more accurate analysis of a detection result obtained by executing PS-InSAR.

The method as illustrated in FIG. 13 also enables use of existing PS-InSAR processing in which SAR images corresponding to a plurality of times are input to output a differential interference image.

Exemplary Embodiment 4

Figure 14:
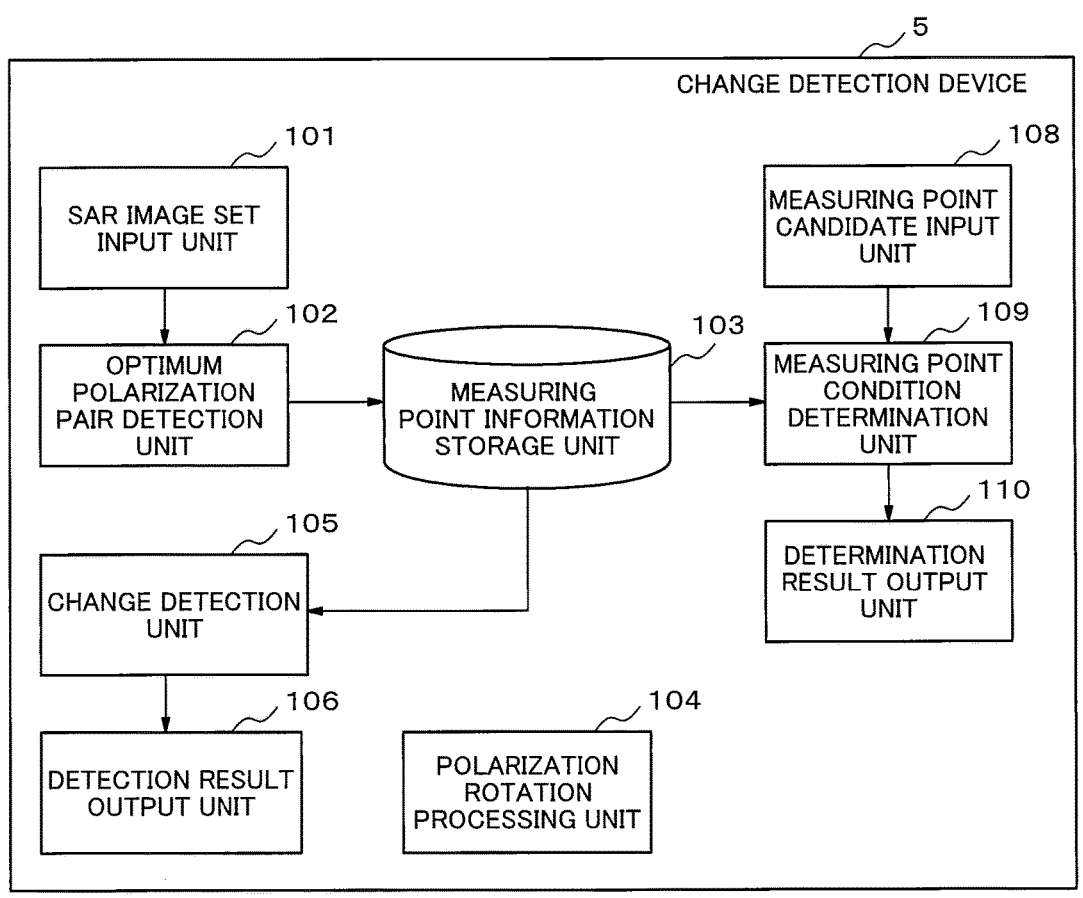
FIG. 14 is a block diagram illustrating a configuration example of a change detection device 5 of a fourth exemplary embodiment.

Next, a fourth exemplary embodiment of the present invention will be described. FIG. 14 is a block diagram illustrating a configuration example of a change detection device 5 of the present exemplary embodiment. The change detection device 5 illustrated in FIG. 14 includes a change detection unit 105 and a detection result output unit 106 in addition to the components of the measuring point information providing device 1 of the second exemplary embodiment illustrated in FIG. 6 (the SAR image set input unit 101, the optimum polarization pair detection unit 102, the measuring point information storage unit 103, the polarization rotation processing unit 104, the measuring point candidate input unit 108, the measuring point condition determination unit 109 and the determination result output unit 110).

The change detection unit 105 and the detection result output unit 106 are basically the same as those of the third exemplary embodiment. The change detection unit 105 in the present exemplary embodiment uses, as a measuring point, a candidate point determined to be appropriate as a measuring point by the measuring point condition determination unit 109 to detect a change at the measuring point.

In the present exemplary embodiment, before determining a measuring point, a pixel corresponding to a designated measuring point candidate is considered as a target pixel and after the measuring point is determined, a pixel corresponding to the determined measuring point is considered as a target pixel.

In the present exemplary embodiment, the measuring point condition determination unit 109 determines whether a candidate point which is a spot designated by a user and considered as a measuring point candidate is appropriate as a measuring point or not and when determining that it is appropriate for a measuring point, sets the candidate point as a measuring point. When determining that the candidate point is not appropriate for a measuring point, the measuring point condition determination unit 109 causes the determination result output unit 110 to output to that effect. The measuring point condition determination unit 109 may also cause the determination result output unit 110 to output a determination result irrespective of whether the candidate point is appropriate for a measuring point or not and ask a user whether to use the candidate point as a measuring point.

Figure 15:
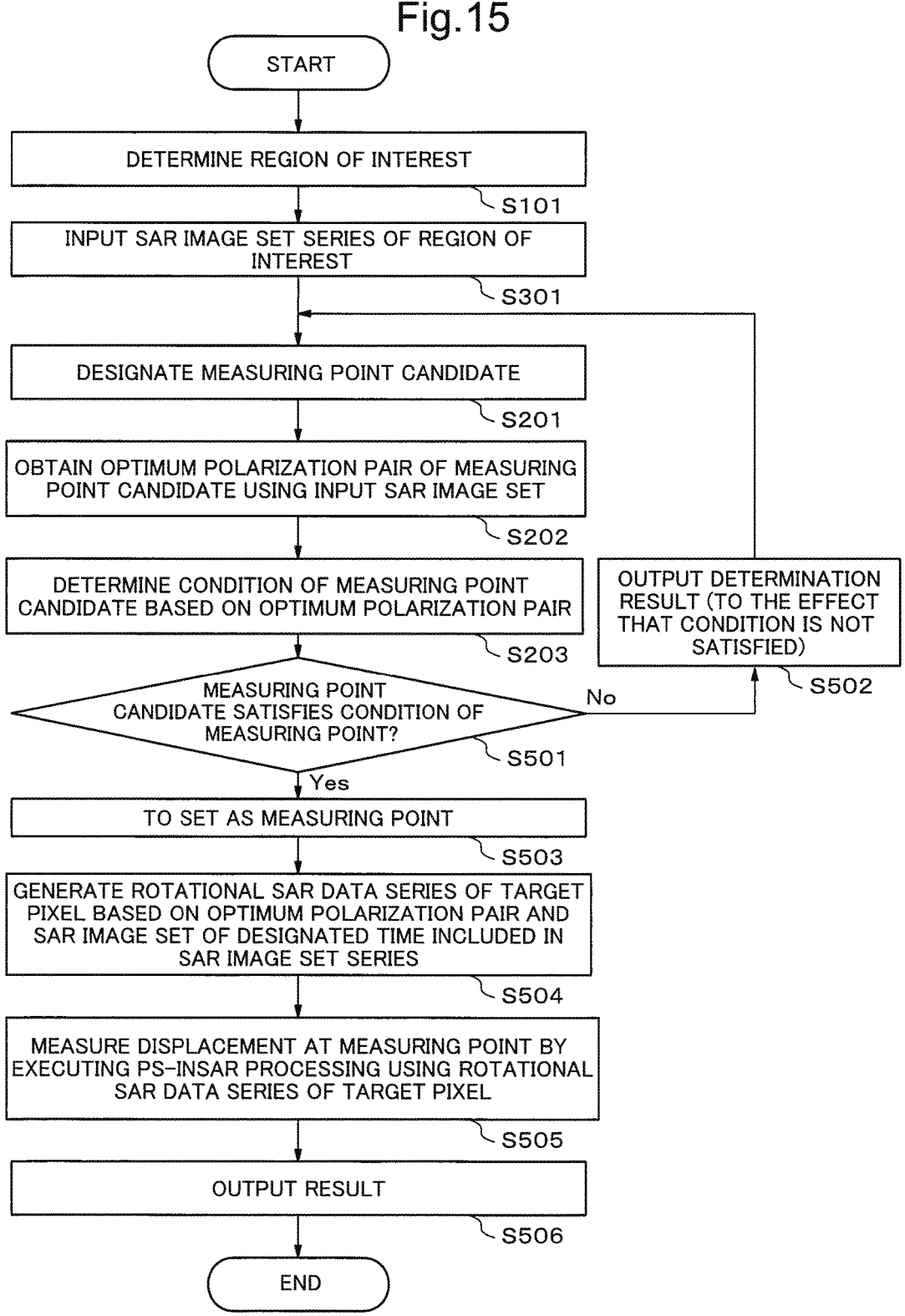
FIG. 15 is a flowchart illustrating one operation example of the change detection device 5 of the fourth exemplary embodiment.

FIG. 15 is a flowchart illustrating one operation example of the change detection device 5 of the present exemplary embodiment. FIG. 15 illustrates an operation example of the change detection device 5 which detects distortion or the like of a target object by executing displacement measurement with respect to a spot designated by a user within a region of interest. In the following, description will be made of a case, as an example, where the change detection device 5 includes the change detection unit 105A as illustrated in FIG. 10 as the change detection unit 105. Since in the following, processing at Steps S101 and S301 is the same as in the examples illustrated in FIG. 12 and FIG. 13, no description will be made thereof.

In the present example, when the SAR image set input unit 101 inputs an SAR image set series including SAR image sets with respect to a region including a region of interest (Step S301), the measuring point candidate input unit 108 then causes a user to designate at least one candidate for a spot (measuring point) at which displacement is to be measured in particular within the region of interest (Step S201).

Next, the optimum polarization pair detection unit 102 detects an optimum polarization pair of a pixel corresponding to the designated candidate point by executing polarization rotation processing using the input at least one SAR image set (Step S202). The optimum polarization pair detection unit 102 also generates measuring point information including information indicative of the detected optimum polarization pair of the pixel in question and stores the same in the measuring point information storage unit 103.

Next, the measuring point condition determination unit 109 determines whether the designated candidate point satisfies a condition determined in advance as a measuring point based on the measuring point information (Step S203). The processing at Steps S201 to S203 is the same as the operation example of the second exemplary embodiment illustrated in FIG. 7.

When the designated candidate point fails to satisfy the condition for a measuring point as a result of the determination made at Step 203, the result to that effect is output to a user through the determination result output unit 110 (No at Step S501, Step S502). Thereafter, processing may be returned to Step S201 to designate other candidate for a measuring point.

On the other hand, when the designated candidate point satisfies the condition for a measuring point, the candidate point is set to be a measuring point (Step S503). In the following, a target pixel in the present example will represent a pixel corresponding to a measuring point in question.

Next, the rotational SAR data generation unit 151 of the change detection unit 105 generates a rotational SAR data series for the target pixel based on the optimum polarization pair of the target pixel which is indicated by the measuring point information and an SAR image set corresponding to designated time which is included in the SAR image set series (Step S504).

Next, the displacement measurement unit 152A of the change detection unit 105 measures displacement at a spot (spot designated as a candidate for a measuring point) corresponding to the target pixel by executing PS-InSAR processing using the generated rotational SAR data series of the target pixel (Step S505). The displacement measurement unit 152A may output, for example, information indicative of displacement appearing between designated times of the target pixel which is obtained as a result of the measurement (a maximum value or a cumulative total value of phase differences between times included in the designated time, or the like). With respect to some target pixel, even an optimum polarization pair has a low reflection intensity or has no PS properties, so that a condition for a measuring point is not satisfied and information indicative of being immeasurable is accordingly output in some cases.

Lastly, the detection result output unit 106 outputs the information obtained at Step S505 as information indicative of the change detection result at the designated spot (Step S506). The detection result output unit 106 may, for example, determine a change or no change at the designated spot based on the information indicative of the displacement of the target pixel between the designated times which is obtained from the displacement measurement unit 152A and output the information obtained at Step S106 together with the determination result (change or no change).

When there are a plurality of measuring point candidates, the processing of Steps S202 to S506 or to S502 is repeatedly executed.

A described in the foregoing, the present exemplary embodiment increases a possibility of detecting a change at a spot designated by a user. The reason is that the change detection device 5 executes the PS-InSAR processing after obtaining an optimum polarization pair of a pixel corresponding to a spot in question and then generating a rotational SAR data series as SAR data formed of optimum polarization pairs at the spot in question at a plurality of times. For example, when only SAR data formed of one transmission and reception polarization pair is used, a spot in question could not be processed as a measuring point because a reflection intensity obtained by the transmission and reception polarization pair is too low. By contrast, according to the present invention, even with respect to such a spot, displacement can be measured at the spot using other transmission and reception polarization pair having a higher reflection intensity, if any. This is the very evidence that the present invention enables an increase in change detection sensitivity.

Further, according to the present exemplary embodiment, when the spot in question cannot be processed as a measuring point even with an optimum polarization pair, outputting information to that effect to the user leads to replacement with other spot in the vicinity. This is the very evidence that the present invention has further increase change detection sensitivity.

In addition, since a user is allowed to designate a measuring point with ease and more reliably, a change of an object or the ground surface as a target can be detected more accurately.

A further effect can be obtained that thus enabling designation of a measuring point with ease and more reliably leads to more accurate execution of deterioration analyses of artificial structures such as buildings, roads, bridges and the like, or analyses of ground roughness change such as land subsidence measurement, land diastrophism measurement and the like.

While the above third and fourth exemplary embodiments also have been described using, as an example, a case where an optimum polarization pair can be set arbitrarily, it is also possible to use only the four basic polarization pairs, an HH polarization, an HV polarization, a VH polarization and a VV polarization as optimum polarization pair candidates. In such a case, the polarization rotation processing unit 104 of the change detection device 5 can be omitted.

In such a case, based on the measuring point information, the change detection unit 105 may selectively detect a change at a spot corresponding a target pixel by, as necessary, selectively using SAR data formed of an optimum polarization pair of the target pixel from among SAR data formed of the four basic polarization pairs of the target pixel at designated time included in the SAR image set series.

Figure 16:
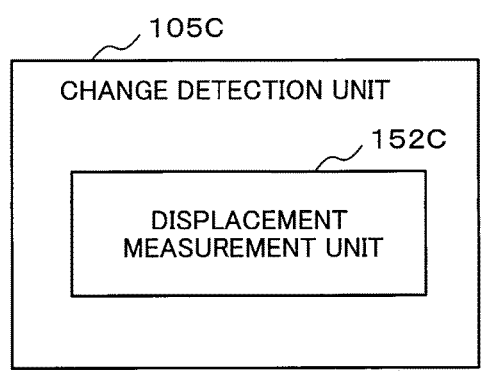
FIG. 16 is a block diagram illustrating a further example of the change detection unit 105.
Figure 17:
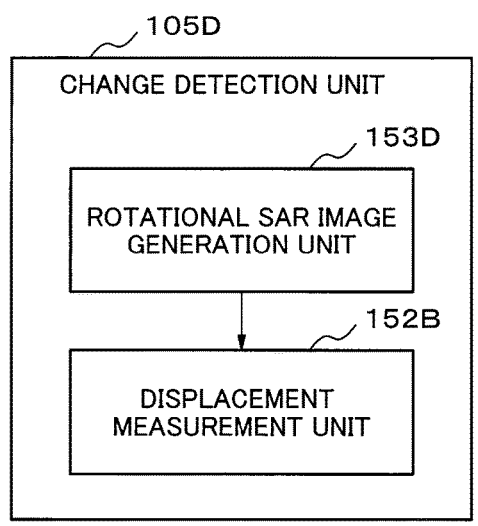
FIG. 17 is a block diagram illustrating a still further example of the change detection unit 105.

FIG. 16 and FIG. 17 are block diagrams illustrating configuration examples of a change detection unit 105 in a case where optimum polarization pair candidates include only the four basic polarization pairs, an HH polarization, an HV polarization, a VH polarization and a VV polarization. A change detection unit 105C illustrated in FIG. 16 includes a displacement measurement unit 152C.

The displacement measurement unit 152C is basically the same as the displacement measurement unit 152A of the change detection unit 105A illustrated in FIG. 10, with the only difference in using SAR data formed of the four basic polarization pairs of a target pixel at designated time which is included in an SAR image set series in place of using a rotational SAR data series of the target pixel. For example, when SAR data formed of the four basic polarization pairs of a target pixel at designated time which is included in an SAR image set series is input, the displacement measurement unit 152C selects SAR data formed of an optimum polarization pair at each time based on the measuring point information to measure displacement at a spot corresponding to the target pixel.

The displacement measurement unit 152C is the same as the above-described displacement measurement unit 152A with the only difference in selectively using SAR data formed of an optimum polarization pair of a target pixel in question at designated time which is included in an SAR image set series based on the measuring point information.

A change detection unit 105D illustrated in FIG. 17 includes a rotational SAR image generation unit 153D and the displacement measurement unit 152B.

The rotational SAR image generation unit 153D is basically the same as the rotational SAR image generation unit 153B of the change detection unit 105 of the first exemplary embodiment illustrated in FIG. 11, with the only difference in using SAR data formed of the four basic polarization pairs of a target pixel at designated time which is included in an SAR image set series in place of using a rotational SAR data series of the target pixel. For example, when SAR data formed of the four basic polarization pairs of a target pixel at designated time which is included in an SAR image set series is input, the rotational SAR image generation unit 153D selects SAR data formed of an optimum polarization pair for each target pixel at each time based on the measuring point information and integrates the data to generate a rotational SAR image corresponding to the designated time.

The rotational SAR image generation unit 153D is the same as the above-described rotational SAR image generation unit 153B with the only difference in using SAR data formed of an optimum polarization pair of a pixel in question at the designated time which is included in an SAR image set series selected based on the measuring point information.

Although in each of the above-described exemplary embodiments, the description has been made of a case where the measuring point information providing device 1 and the change detection device 5 each include the measuring point information storage unit 103 as a means for storing measuring point information, the measuring point information storage unit 103 can be omitted. In such a case, the measuring point information can be just output from the optimum polarization pair detection unit 102 directly to the measuring point information output unit 107, the measuring point condition determination unit 109 or the change detection unit 105.

Figure 18:
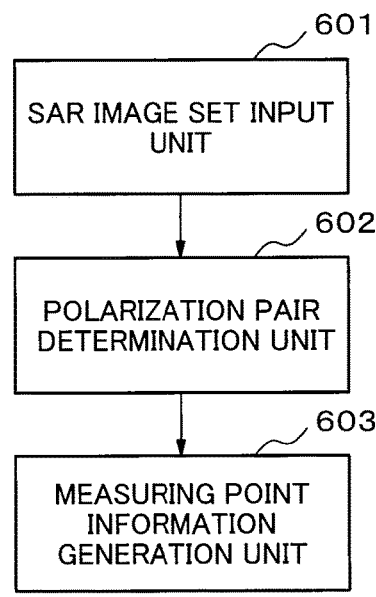
FIG. 18 is a block diagram illustrating an outline of the present invention.

Next, an outline of the present invention will be described. FIG. 18 is a block diagram illustrating an outline of the present invention. As illustrated in FIG. 18, the measuring point information providing device or the change detection device according to the present invention includes an SAR image set input unit 601, a polarization pair determination unit 602 and a measuring point information generation unit 603.

The SAR image set input unit 601 (e.g. the SAR image set input unit 101) inputs an SAR image set holding at least information indicative of a reflection intensity and a phase, the information being generated from observation data formed of the four basic polarization pairs, i.e. an HH polarization, an HV polarization, a VH polarization and a VV polarization which are combinations of transmission and reception polarizations observed by the synthetic aperture radar at generally the same time, so as to be associated with each pixel corresponding to a resolution cell within a field of vision for image capturing including a specific region (region of interest).

Using the input SAR image set, the polarization pair determination unit 602 (e.g. the optimum polarization pair detection unit 102) determines a polarization pair whose reflection intensity is not less than a predetermined value or the highest with respect to each target pixel.

The measuring point information generation unit 603 (e.g. the optimum polarization pair detection unit 102) generates measuring point information including at least information indicative of the determined polarization pair of the target pixel based on the polarization pair determined by the polarization pair determination unit 602.

With such characteristic elements provided, as many spots at which displacement can be measured as possible can be detected or such spots can be detected without missing them and as a result, providing a user with obtained information or using such information for designation of a measuring point or for an analysis of a measurement result leads to improvement in change detection sensitivity.

Although not illustrated, the measuring point information providing device according to the present invention may further include a measuring point information output unit (e.g. the measuring point information output unit 107) which outputs measuring point information generated by the measuring point information generation unit 602 or information indicating whether a spot corresponding to a target pixel is appropriate for a measuring point or not, or indicating to what degree it is appropriate for a measuring point, which information is generated based on the measuring point information.

As the information indicating to what degree a spot corresponding to a target pixel is appropriate for a measuring point, the measuring point information output unit may generate and output a rotational SAR image which holds at least information indicative of a reflection intensity and a phase obtained by a determined polarization pair of the target pixel at least so as to be associated with the pixel based on an input SAR image set and the measuring point information.

Although not illustrated, the measuring point information providing device of the present invention may further include a measuring point candidate input unit (e.g. the measuring point candidate input unit 108) which inputs a candidate for a measuring point, a measuring point condition determination unit (e.g. the measuring point condition determination unit 109) which determines whether an input measuring point candidate is appropriate as a measuring point or not based on the measuring point information by using at least a reflection intensity obtained by a determined polarization pair of a pixel corresponding to the candidate in question, and a determination result output unit (e.g. the determination result output unit 110) which outputs a determination result made by the measuring point condition determination unit, wherein the polarization pair determination unit 602 may determine a polarization pair whose reflection intensity is not less than a predetermined value or the highest with respect to each target pixel which is a pixel corresponding to an input measuring point candidate, and the measuring point information generation unit 603 may generate measuring point information including at least information indicative of a determined polarization pair of a target pixel and information indicative of a reflection intensity obtained by the polarization pair in question of the target pixel in question based on a polarization pair determination result obtained by the polarization pair determination unit 602.

Although the present invention has been described with reference to the exemplary embodiments and the examples in the foregoing, the present invention is not limited to the above-described exemplary embodiments. Various modifications those skilled in the art can appreciate can be made in configuration and details of the present invention within the scope of the present invention.

Although a part or all of the above-described exemplary embodiments can be also recited as in the following supplementary notes, they are not limited to the following.

(Supplementary Note 1)

(Supplementary Note 2)

(Supplementary Note 3) The change detection device according to the supplementary note 1 or 2, wherein with respect to each target pixel, the polarization pair determination unit determines a polarization pair whose reflection intensity is not less than a predetermined value or the highest from among predetermined polarization pair candidates.

(Supplementary Note 4) The change detection device according to any one of the supplementary notes 1 to 3, wherein polarization pair candidates are four kinds of an HH polarization, an HV polarization, a VH polarization and a VV polarization.

(Supplementary Note 5) The change detection device according to any one of the supplementary notes 1 to 3, wherein the polarization pair candidates are a set of pairs each including a transmission polarization having a polarization rotation angle of any of 0° to 180° and a reception polarization having a polarization rotation angle of any of 0° to 180°.

(Supplementary Note 6) The change detection device according to any one of the supplementary notes 1 to 5, further including a polarization rotation processing unit which uses at least one SAR image set including a designated point within an image region to calculate a reflection intensity obtained by an arbitrary combination of transmission and reception polarizations at the point in question; and a rotational SAR data generation unit which uses the polarization rotation processing unit to generate, for each target pixel, rotational SAR data corresponding to at least two times from an input SAR image set, each of the rotational SAR data including information indicative of a reflection intensity and a phase obtained by a determined polarization pair of the pixel in question at the corresponding time, wherein a polarization pair determination unit uses the polarization rotation processing unit to calculate, with respect to each target pixel, a reflection intensity of each of predetermined polarization pair candidates from at least one SAR image set of the input SAR images and determines a polarization pair based on the calculated reflection intensity of each candidate, and a displacement measurement unit measures, with respect to each target pixel, displacement at a spot corresponding to the pixel based on rotational SAR data of the pixel corresponding to at least two times which is generated by the rotational SAR data generation unit.

(Supplementary Note 7) The change detection device according to the supplementary note 6, including a rotational SAR image generation unit which based on a polarization pair determined by the polarization pair determination unit and an input SAR image set, generates rotational SAR images corresponding to at least two different times, each of the rotational SAR images holding, at least so as to be associated with each target pixel, at least information indicative of a reflection intensity and a phase obtained by a determined polarization pair of the pixel at the corresponding time, wherein using the rotational SAR images corresponding to at least two times which are generated by the rotational SAR image generation unit, the displacement measurement unit measures, with respect to each target pixel, displacement at a spot corresponding to the pixel in question.

(Supplementary Note 8) The change detection device according to any one of the supplementary notes 1 to 7, including a differential interference image generation unit which generates, based on a displacement measurement result obtained by the displacement measurement unit, a differential interference image at least so as to be associated with each target pixel, the differential interference image being an image which holds information indicative of a phase difference caused by a change at a spot corresponding to the pixel or pixel information corresponding to an amount of the phase difference.

INDUSTRIAL APPLICABILITY

Not limited to such an application for measuring point information acquisition, change detection or for using PS- InSAR, the present invention can be suitably used for any application that uses a phase change at a certain point based on information indicative of a reflection intensity and a phase in scattered waves of radio waves at the point.

REFERENCE SIGNS LIST

1 Measuring point information providing device
2 Flying body
3 Synthetic aperture radar
4 Field of vision for image capturing
5 Change detection device
101 SAR image set input unit
102 Optimum polarization pair detection unit
103 Measuring point information storage unit
104 Polarization rotation processing unit
105, 105A, 105B, 105C, 105D Change detection unit
106 Detection result output unit
107 Measuring point information output unit
108 Measuring point candidate input unit
109 Measuring point condition determination unit
110 Determination result output unit
151 Rotational SAR data generation unit
152A, 152B, 152C Displacement measurement unit
153B, 153D Rotational SAR image generation unit
601 SAR image set input unit
602 Polarization pair determination unit
603 Measuring point information generation unit

The invention claimed is:

1. A measuring point information providing device comprising:
a processor configured to execute to:
receive an SAR image set comprising information indicative of a reflection intensity and a phase associated with each pixel corresponding to a resolution cell within a field of vision for image capturing including a specific region, the information being generated from observation data formed of four basic polarization pairs including an HH polarization, an HV polarization, a VH polarization and a VV polarization, which are combinations of transmission and reception polarizations observed by a synthetic aperture radar at the same time;
determine a polarization pair whose reflection intensity is not less than a predetermined value or whose reflection intensity is the highest as a combination of optimum transmission and reception polarizations with respect to each target pixel, the polarization pair determined by changing a rotation angle pair, pixel by pixel, using the received SAR image set;
generate, based on the polarization pair that is determined, measuring point information including at least information indicative of the determined polarization pair of the target pixel; and
output one of:
(i) the measuring point information that is generated, and
(ii) information indicating whether a spot corresponding to a target pixel is appropriate as a measuring point or indicating to which degree the spot is appropriate as the measuring point, the information being generated based on the measuring point information,
wherein the processor is further configured to, as information indicating to which degree a spot corresponding to a target pixel is appropriate as a measuring point, generate and output a rotational SAR image which holds at least information indicative of a reflection intensity and a phase obtained by the determined polarization pair of the pixel so as to be associated with the target pixel based on the received SAR image set and the measuring point information.

2. The measuring point information providing device according to claim 1, wherein the processor is further configured to execute to:
receive a candidate for a measuring point;
determine whether the received candidate for the measuring point is appropriate as a measuring point or not based on the measuring point information by using at least a reflection intensity obtained by the determined polarization pair of the pixel corresponding to the received candidate for the measuring point in question; and
output a determination result of the determining whether the received candidate for the measuring point is appropriate as the measuring point or not, wherein the processor is further configured to
determine a polarization pair whose reflection intensity is not less than a predetermined value or the highest with respect to each target pixel which is a pixel corresponding to the received candidate for the measuring point, and
generate measuring point information including at least information indicative of the determined polarization pair of the target pixel and information indicative of a reflection intensity obtained by the polarization pair of the target pixel in question based on a polarization pair determination result of the determining the polarization pair whose reflection intensity is not less than a predetermined value or the highest.

3. A change detection device comprising:
a processor configured to execute to:
receive at least two SAR image sets, each of the two SAR image sets comprising information indicative of a reflection intensity and a phase associated with each pixel corresponding to a resolution cell within a field of vision for image capturing including a specific region, the information being generated from observation data formed of four basic polarization pairs including an HH polarization, an HV polarization, a VH polarization and a VV polarization which are combinations of transmission and reception polarizations observed by a synthetic aperture radar at the same time;
determine a polarization pair whose reflection intensity is not less than a predetermined value or whose reflection intensity is the highest as a combination of optimum transmission and reception polarizations with respect to each target pixel, the polarization pair determined by changing a rotation angle pair, pixel by pixel, using at least one of the received at least two SAR image sets;
generate, based on the polarization pair that determined, measuring point information including at least information indicative of the determined polarization pair of the target pixel;
measure displacement at a spot corresponding to the target pixel based on the measuring point information and the received at least two SAR image sets;
output information indicative of a measurement result that is obtained by the measuring of the displacement at the spot corresponding to the target pixel; and output one of:
(i) the measuring point information, and
(ii) information indicating whether a spot corresponding to the target pixel is appropriate as a measuring point or not or indicating to which degree the spot is appropriate as a measuring point, the information being generated based on the measuring point information, wherein the processor is configured to, as information indicating to which degree a spot corresponding to a target pixel is appropriate as a measuring point, generate and output a rotational SAR image which holds at least information indicative of a reflection intensity and a phase obtained by the determined polarization pair of the pixel so as to be associated with the target pixel based on the received SAR image set and the measuring point information.

4. A change detection device comprising:
at least one processor configured to execute:
receive at least two SAR image sets comprising information indicative of a reflection intensity and a phase associated with each pixel corresponding to a resolution cell within a field of vision for image capturing including a specific region, the information being generated from observation data formed of four basic polarization pairs including an HH polarization, an HV polarization, a VH polarization and a VV polarization which are combinations of transmission and reception polarizations observed by a synthetic aperture radar at the same time;
receive a candidate for a measuring point;
determine a polarization pair whose reflection intensity is not less than a predetermined value or whose reflection intensity is the highest as a combination of optimum transmission and reception polarizations with respect to each target pixel as a pixel corresponding to the input measuring point candidate, the polarization pair determined by changing a rotation angle pair, pixel by pixel using at least one of the received at least two SAR image sets;
generate, based on the polarization pair that is determined, measuring point information including at least information indicative of the determined polarization pair of the target pixel and information indicative of a reflection intensity obtained by the polarization pair of the target pixel in question;
determine whether the received measuring point candidate is appropriate as a measuring point or not based on the measuring point information by using at least a reflection intensity obtained by the determined polarization pair of the pixel corresponding to the candidate in question;
output a determination result of the determining whether the received measuring point candidate is appropriate as a measuring point or not;
use, as a measuring point, a candidate determined to be appropriate as a measuring point to measure displacement at the measuring point based on the measuring point information and the received SAR image sets; and
generate and output an interference image based on the measured displacement of each target pixel.

5. A measuring point information providing method comprising:
receiving, by a processor, an SAR image set comprising information indicative of a reflection intensity and a phase associated with each pixel corresponding to a resolution cell within a field of vision for image capturing including a specific region, the information being generated from observation data formed of four basic polarization pairs including an HH polarization, an HV polarization, a VH polarization and a VV polarization which are combinations of transmission and reception polarizations observed by a synthetic aperture radar at the same time;
determining, by the processor, a polarization pair whose reflection intensity is not less than a predetermined value or whose reflection intensity is the highest with respect to each target pixel, the polarization pair determined by changing a rotation angle pair, pixel by pixel using the received SAR image set;
generating, by the processor, based on the polarization pair that is determined, measuring point information including at least information indicative of the determined polarization pair of the target pixel; and
outputting one of: (i) the measuring point information that is generated, and (ii) information indicating whether a spot corresponding to a target pixel is appropriate as a measuring point or indicating to which degree the spot is appropriate as the measuring point, the information being generated based on the measuring point information, wherein
the outputting comprises generating and outputting, as information indicating to which degree a spot corresponding to a target pixel is appropriate as a measuring point, a rotational SAR image which holds at least information indicative of a reflection intensity and a phase obtained by the determined polarization pair of the pixel so as to be associated with the target pixel based on the received SAR image set and the measuring point information.

6. A change detection method comprising:
receiving, by a processor, at least two SAR image sets comprising information indicative of a reflection intensity and a phase associated with each pixel corresponding to a resolution cell within a field of vision for image capturing including a specific region, the information being generated from observation data formed of four basic polarization pairs including an HH polarization, an HV polarization, a VH polarization and a VV polarization which are combinations of transmission and reception polarizations observed by a synthetic aperture radar at the same time;
determining, by the processor, a polarization pair whose reflection intensity is not less than a predetermined value or whose reflection intensity is the highest as a combination of optimum transmission and reception polarizations with respect to each target pixel, the polarization pair determined by using the received SAR image sets;
based on the polarization pair that is determined, generating, by the processor, measuring point information including at least information indicative of the determined polarization pair of the target pixel;
measuring, by the processor, displacement at a spot corresponding to the target pixel based on the measuring point information and the received at least two SAR image sets; and
outputting, by the processor, together with information indicative of a measurement result of displacement at a spot corresponding to the target pixel, the measuring point information, or information indicating whether a spot corresponding to the target pixel is appropriate as a measuring point or not or indicating to which degree the spot is appropriate as a measuring point, the information being generated based on the measuring point information, wherein the outputting comprises generating and outputting, as information indicating to which degree a spot corresponding to a target pixel is appropriate as a measuring point, a rotational SAR image which holds at least information indicative of a reflection intensity and a phase obtained by the determined polarization pair of the pixel so as to be associated with the target pixel based on the received SAR image set and the measuring point information.

7. A change detection method comprising receiving, by a processor, at least two SAR image sets comprising information indicative of a reflection intensity and a phase associated with each pixel corresponding to a resolution cell within a field of vision for image capturing including a specific region, the information being generated from observation data formed of four basic polarization pairs including an HH polarization, an HV polarization, a VH polarization and a VV polarization which are combinations of transmission and reception polarizations observed by a synthetic aperture radar at the same time;

receiving, by the processor, a candidate for a measuring point;

determining, by the processor, a polarization pair whose reflection intensity is not less than a predetermined value or whose reflection intensity is the highest with respect to each target pixel as a pixel corresponding to the received measuring point candidate, the polarization pair determined by changing a rotation angle pair, pixel by pixel using the received at least two SAR image sets;

generating, by the processor, based on the determined polarization pair, measuring point information including at least information indicative of the determined polarization pair of the target pixel and information indicative of a reflection intensity obtained by the polarization pair of the target pixel in question;

determining, by the processor, whether the received measuring point candidate is appropriate as a measuring point or not based on the measuring point information by using at least a reflection intensity obtained by the polarization pair of a pixel corresponding to the candidate in question;

when determining to be inappropriate as a measuring point by the determination, outputting information to that effect;

when determining to be appropriate as a measuring point by the determination, measuring displacement at the measuring point by using the candidate in question for a measuring point based on the measuring point information and received SAR image sets; and generating and outputting an interference image based on the measured displacement of each target pixel.

8. A non-transitory computer readable medium which records a program, the program causing a computer to execute:

SAR image set receive processing of receiving an SAR image set comprising information indicative of a reflection intensity and a phase associated with each pixel corresponding to a resolution cell within a field of vision for image capturing including a specific region, the information being generated from observation data formed of four basic polarization pairs including an HH polarization, an HV polarization, a VH polarization and a VV polarization which are combinations of transmission and reception polarizations observed by a synthetic aperture radar at the same time;

polarization pair determination processing of determining a polarization pair whose reflection intensity is not less than a predetermined value or whose reflection intensity is the highest as a combination of optimum transmission and reception polarizations with respect to each target pixel, the polarization pair determined by changing a rotation angle pair, pixel by pixel, using the received SAR image set;

measuring point information generation processing of generating, based on a polarization pair determined by the polarization pair determination processing, measuring point information including at least information indicative of the determined polarization pair of a target pixel; and measuring point information output processing of outputting one of:
(i) the measuring point information generated by the measuring point information generation processing, and
(ii) information indicating whether a spot corresponding to a target pixel is appropriate as a measuring point or indicating to which degree the spot is appropriate as the measuring point, the information being generated based on the measuring point information, wherein the measuring point information output processing further comprises processing of, as information indicating to which degree a spot corresponding to a target pixel is appropriate as a measuring point, generating and outputting a rotational SAR image which holds at least information indicative of a reflection intensity and a phase obtained by the determined polarization pair of the pixel so as to be associated with the target pixel based on the received SAR image set and the measuring point information.

9. A non-transitory computer readable medium which records a program, the program causing a computer to execute:

SAR image set receive processing of receiving at least two SAR image sets comprising information indicative of a reflection intensity and a phase associated with each pixel corresponding to a resolution cell within a field of vision for image capturing including a specific region, the information being generated from observation data formed of four basic polarization pairs including an HH polarization, an HV polarization, a VH polarization and a VV polarization which are combinations of transmission and reception polarizations observed by a synthetic aperture radar at the same time;

polarization pair determination processing of determining a polarization pair whose reflection intensity is not less than a predetermined value or whose reflection intensity is the highest as a combination of optimum transmission and reception polarizations with respect to each target pixel, the polarization pair determined by changing a rotation angle pair, pixel by pixel, using the received at least two SAR image sets;

measuring point information generation processing of generating, based on a polarization pair determined by the polarization pair determination processing, measuring point information including at least information indicative of the determined polarization pair of the target pixel;

displacement measurement processing of measuring displacement at a spot corresponding to the target pixel based on the measuring point information and the received at least two SAR image sets;

first output processing of outputting information indicative of a measurement result of displacement at a spot corresponding to the target pixel; and second output processing of outputting the measuring point information, or information indicating whether a spot corresponding to the target pixel is appropriate as a measuring point or not or indicating to which degree the spot is appropriate as a measuring point, the information being generated based on the measuring point information, wherein the second output processing further comprises processing of, as information indicating to which degree a spot corresponding to a target pixel is appropriate as a measuring point, generate and output a rotational SAR image which holds at least information indicative of a reflection intensity and a phase obtained by the determined polarization pair of the pixel so as to be associated with the target pixel based on the received SAR image set and the measuring point information.

10. A non-transitory computer readable medium which records a program, the program causing a computer to execute:

SAR image set receive processing of receiving at least two SAR image sets comprising information indicative of a reflection intensity and a phase associated with each pixel corresponding to a resolution cell within a field of vision for image capturing including a specific region, the information being generated from observation data formed of four basic polarization pairs including an HH polarization, an HV polarization, a VH polarization and a VV polarization which are combinations of transmission and reception polarizations observed by a synthetic aperture radar at the same time;

measuring point candidate input processing of receiving a candidate for a measuring point;

polarization pair determination processing of determining a polarization pair whose reflection intensity is not less than a predetermined value or whose reflection intensity is the highest as a combination of optimum transmission and reception polarizations with respect to each target pixel as a pixel corresponding to the received measuring point candidate, the polarization pair determined by changing a rotation angle pair, pixel by pixel using the received at least two SAR image sets;

measuring point information generation processing of generating, based on a polarization pair determined by the polarization pair determination processing, measuring point information including at least information indicative of a determined polarization pair of the target pixel and information indicative of a reflection intensity obtained by the polarization pair of the target pixel in question;

measuring point condition determination processing of determining whether the received measuring point candidate is appropriate as a measuring point or not based on the measuring point information by using at least a reflection intensity obtained by the determined polarization pair of a pixel corresponding to the candidate in question;

determination result output processing of outputting a determination result made by the measuring point condition determination processing;

displacement measurement processing of using, as a measuring point, a candidate determined to be appropriate as a measuring point by the measuring point condition determination processing to measure displacement at the measuring point based on the measuring point information and the received at least two SAR image sets; and output processing of generating and outputting an interference image based on the measured displacement of each target pixel.

* * * * *